(12) United States Patent
Owechko et al.

(10) Patent No.: US 10,176,382 B1
(45) Date of Patent: Jan. 8, 2019

(54) METHOD AND APPARATUS FOR SPARSE ASSOCIATIVE RECOGNITION AND RECALL FOR VISUAL MEDIA REASONING

(71) Applicant: HRL Laboratories, LLC, Malibu, CA (US)

(72) Inventors: Yuri Owechko, Newbury Park, CA (US); Shanka R. Rao, Agoura Hills, CA (US); Shinko Y. Cheng, Cupertino, CA (US); Suhas E. Chelian, San Jose, CA (US); Rajan Bhattacharyya, Sherman Oaks, CA (US); Michael D. Howard, Westlake Village, CA (US)

(73) Assignee: HRL Laboratories, LLC, Malibu, CA (US)

( * ) Notice: Subject to any disclaimer, the term of this patent is extended or adjusted under 35 U.S.C. 154(b) by 148 days.

(21) Appl. No.: 15/265,819

(22) Filed: Sep. 14, 2016

Related U.S. Application Data

(60) Provisional application No. 62/235,931, filed on Oct. 1, 2015.

(51) Int. Cl.
  *G06K 9/62* (2006.01)
  *G06K 9/00* (2006.01)
  *G06T 7/00* (2017.01)

(52) U.S. Cl.
  CPC ..... *G06K 9/00751* (2013.01); *G06K 9/00718* (2013.01); *G06T 7/0083* (2013.01);
  (Continued)

(58) Field of Classification Search
  CPC .......... G06T 2207/20084; G06N 3/049; G06K 9/6249; G06K 2009/4695; G06K 9/6277–9/6278; G06K 9/0071–9/00765
  See application file for complete search history.

(56) References Cited

U.S. PATENT DOCUMENTS

| | | | | |
|---|---|---|---|---|
| 2009/0322871 | A1* | 12/2009 | Ji | G01S 7/412 348/115 |
| 2014/0258195 | A1* | 9/2014 | Weng | G06N 3/02 706/19 |
| 2016/0358075 | A1* | 12/2016 | Zhang | G06N 3/088 |

OTHER PUBLICATIONS

P. Felzenszwalb, R. Girshick, D. McAllester, and D. Ramanan, "Object Detection with Discriminatively Trained Part-Based Models," in IEEE Trans. on Pattern Anal. and Machine Intell., 32(9): pp. 1627-1645, 2010.

(Continued)

*Primary Examiner* — Brian Werner
(74) *Attorney, Agent, or Firm* — Tope-McKay & Associates

(57) ABSTRACT

Described is system and method for visual media reasoning. An input image is filtered using a first series of kernels tuned to represent objects of general categories, followed by a second series of sparse coding filter kernels tuned to represent objects of specialized categories, resulting in a set of sparse codes. Object recognition is performed on the set of sparse codes to generate object and semantic labels for the set of sparse codes. Pattern completion is performed on the object and semantic labels to recall relevant meta-data in the input image. Bi-directional feedback is used to fuse the input data with the relevant meta-data. An annotated image with information related to who is in the input image, what is in the input image, when the input image was captured, and where the input image was captured is generated.

18 Claims, 13 Drawing Sheets

(52) U.S. Cl.
CPC .. *G06T 7/0095* (2013.01); *G06T 2207/20016* (2013.01); *G06T 2207/20024* (2013.01); *G06T 2207/20084* (2013.01); *G06T 2210/12* (2013.01)

(56) References Cited

OTHER PUBLICATIONS

L. Bourdev and J. Malik, "Poselets: body part detectors training using 3D human pose annotations," in ICCV, 2009, pp. 1365-1372.
Y. LeCun, F. Huang, and L. Bottou, "Learning Methods for Generic Object Recognition with Invariance to Pose and Lighting," in CVPR, 2004, pp. 1-8.
J. Mutch, and D. Lowe, "Object class recognition and localization using sparse features with limited receptive fields," in Int. J. Comp. Vision, 80(1): pp. 45-57, 2008.
T. Serre, L. Wolf, S. Bileschi, M. Roesenhuber, and T. Poggio, "Robust object recognition with cortex-like mechanisms," in IEEE Trans. on Pattern Anal. and Machine Intell., 29(3): pp. 411-426, 2007.
R. Salakhutdinov and G. E. Hinton, "Deep Boltzmann machines," in AISTATS, 2009, pp. 1-8.
H. Zuo and T. Hastie, "Regularization and variable selection via the elastic net," J. Royal Stat. Soc.:Series B, 67: pp. 301-320, 2005.
H. Lee, A. Battle, R. Raina, and A. Ng, "Efficient sparse coding algorithms," Proc. of NIPS, 2006, pp. 1-8.
M. Aharon, M. Elad, and A. Bruckstein, "K-SVD: An Algorithm for Designing Overcomplete Dictionaries for Sparse Representation," in IEEE Trans. on Signal Processing, 54(11): pp. 4311-4322, 2006.
Q. Geng and J. Wright, "On the Local Correctness of L1 Minimization for Dictionary Learning," in Proc. of IEEE International Symposium on Information Theory (ISIT), pp. 3180-3184, 2014.
K. Jarret, K. Kavukcuoglu, M. Ranzato, and Y. LeCun, "What is the best multi-stage architecture for objection recognition," in ICCV, 2009, pp. 2146-2153.
J. Yang and M.-H. Yang, "Learning Hierarchical Image Representation with Sparsity, Saliency and Locality," in BMVC, 2011, pp. 1-11.
R. Achanta, S. Hemani, F. Estrada, and S. Susstrunk, "Frequency-tuned salient region detection," in CVPR, 2009, pp. 1597-1604.
N. Pinto, D. Cox, J. Dicarlo, "Why is real-world visual object recognition hard?" PloS Comp. Bio., 4(1)e27+, 2008, pp. 0151-0156.
H.Lee, R. Grosse, R. Ranganath, and A. Ng, Convolutional deep belief networks for scalable unsupervised learning of hierarchical representations, in ICML, 2009, pp. 1-8.
M. Zeiler, D. Krishnan, G. Taylor, and R. Fergus, "Deconvolutional networks," in CVPR, 2009, pp. 2528-2535.
S. Lazebnik, C. Schmid, and J. Ponce, "Beyond bag of features: Spatial pyramid matching for recognizing natural scene categories," in CVPR, 2006, pp. 1-8.
J. Yang, K. Yu, Y. Gong, and T. Huang, "Linear spatial pyramid matching using sparse codings for image classification," in CVPR, 2009, pp. 1794-1801.
O'Reilly, R.C., Wyatte, D., Herd, S., Mingus, B. & Jilk, D.J. Recurrent Processing during Object Recognition. Frontiers in Psychology, 4, 124, 2013, pp. 1-14.
R. O'Reilly, "Biologically plausible error-driven learning using local activation differences: The generalized recirculation algorithm," in Neural Computation 8: pp. 895-938, 1996.
R. O'Reilly, "Six principles for biologically-based computational models of cortical cognition," in Trends in Cognitive Sciences, 2: pp. 455-462, 1998.
Randall C. O'Reilly; Dean Wyatte; Seth Herd;Brian Mingus; David J. Jilk, "Recurrent processing during object recognition," Front Psychol. Apr. 1, 2013;4:124, pp. 1-21.
R.M. Harlick and L.G. Shapiro, Image Segmentation Techniques, Computer Vision Graphics, Image Processing, 1(29): pp. 100-132, 1985.
J. Shi and J. Malik, "Normalized Cuts and Image Segmentation," in IEEE Trans. on Pattern Anal. and Machine Intell., (27): pp. 888-905, 1997.
L. Itti, C. Koch, "Computational Modeling of Visual Attention," in Nature Reviews Neuroscience, 2(3): pp. 194-203, 2001.
D. Martin, C. Fowlkes, and J. Malik. "Learning to Detect Natural Image Boundaries Using Local Brightness, Color and Texture Cues," in IEEE Trans. on Pattern Anal. and Machine Intell 26(5), 2004, pp. 530-549.
A. Torralba, "Contextual Priming for Object Detection," Int. J. Comp. Vision 53(2): pp. 169-191, 2003.
B. Leibe, A. Leonardis, and B. Schiele, "Combined Object Categorization and Segmentation with an Implicit Shape Model," in ECCV Workshop on Stat. Learning in Comp. Vision, 2004, pp. 1-16.
L. Itti, C. Koch, E. Niebur, "A Model of Saliency-Based Visual Attention for Rapid Scene Analysis," in IEEE Trans. on Pattern Anal. and Machine Intell., 20(11): pp. 1254-1259, 1998.
K. A. Norman, & R. C. O'Reilly, Modeling hippocampal and neocortical contributions to recognition memory: a complementary-learning-systems approach Psychological review,110, pp. 611-646, 2003.
R. C. O'Reilly, R. Bhattacharyya, M.D. Howard, N. Ketz, "Complementary Learning Systems", Cognitive Science, 38, pp. 1229-1248, 2014.
J. E. Lisman, & A. A. Grace, the Hippocampal-VTA Loop: Review Controlling the Entry of Information into Long-Term Memory Neuron, 46, pp. 703-713, 2005.
K. A.Norman,; E. L. Newman, & A. J. Perotte, Methods for reducing interference in the Complementary Learning Systems model: Oscillating inhibition and autonomous memory rehearsal Neural Networks,18, pp. 1212-1228, 2005.
K. A. Norman, How hippocampus and cortex contribute to recognition memory: Revisiting the complementary learning systems model Hippocampus, Wiley Subscription Services, Inc., A Wiley Company, 20, pp. 1217-1227, 2010.
C. Lebiere, C. Gonzalez, & M. Martin, "Instance-based decision-making model of repeated binary choice," Proceedings of ICCM—2007—Eighth International Conference on Cognitive Modeling, Oxford, UK: Taylor & Francis/Psychology Press., pp. 67-72.
M. D. Howard, R. Bhattacharyya, R.C. O'Reilly, G. Ascoli, J.M. Fellous. "Adaptive Recall in Hippocampus", in proceedings BICA 2011 Conference, Nov. 2011, pp. 151-157.
J. Triesch, C. Eckes, "Object Recognition with Deformable Feature Graphs: Faces, Hands, and Cluttered Scenes", in Handbook of Pattern Recognition and Computer Vision, 3rd ed., World Scientific Publishing Co., pp. 461-480, 2005 (Ed: C. Chen).
A. Bosch, A. Zisserman, and X. Munoz. Image classification using random forests and ferns. In Proc. ICCV, 2007, pp. 1-8.
Blei, David M.; Ng, Andrew Y.; Jordan, Michael I. Lafferty, John. ed. "Latent Dirichlet allocation". Journal of Machine Learning Research 3 (4-5): pp. 993-1022. doi:10.1162/jmlr.2003.3.4-5.993, 2003.
Divvala, S. K., Hoiem, D., Hays, J. H., Efros, A. A., & Hebert, M. An empirical study of context in object detection. In Computer Vision and Pattern Recognition, 2009. CVPR 2009. IEEE Conference on (pp. 1271-1278). Presented at the Computer Vision and Pattern Recognition. CVPR 2009. IEEE Conference on. doi:10.1109/CVPR.2009.5206532, 2009.
Galleguillos, C., & Belongie, S. Context based object categorization: A critical survey. Computer Vision and Image Understanding 114, (2010), pp. 712-722.
O'Reilly' R.C. & McClelland, J.L. Hippocampal Conjunctive Encoding, Storage, and Recall: Avoiding a Tradeoff. Hippocampus, 4, pp. 661-682, 1994.
Wei, Gang and Zheyuan Yu, Storage Capacity of Letter Recognition in Hopfield Networks, doi 10.1.1.14.6879, 2007, pp. 1-6.
Pedro F. Felzenszwalb, Ros B. Girshick, David McAllester, Cascade Object Detection with Deformable Parts Models. In Proc. IEEE CVPR 2010, pp. 2241-2248.
Lisman, J. E. Role of the dual entorhinal inputs to hippocampus: a hypothesis based on cue/action (non-self/self) couplets, Progress in brain research 163, pp. 615-625, 2007.

(56) References Cited

OTHER PUBLICATIONS

O'Keefe J, Recce ML: Phase relationship between hippocampal place units and the EEG theta rhythm. Hippocampus, vol. 3, No. 3, pp. 317-330, Jul. 1993.
Skaggs WE, McNaughton BL, Wilson MA, Barnes CA: Theta phase precession in hippocampal neuronal populations and the compression of temporal sequences. Hippocampus,6: pp. 149-172, 1996.
B. A. Olshausen and D. J. Field. Emergence of simple-cell receptive field properties by learning a sparse code for natural images. Nature, 381: pp. 607-609, 1996.
B. A. Olshausen and D. J. Field. Sparse coding with an overcomplete basis set: A strategy employed by V1? Vision Research, vol. 37, No. 23, pp. 3311-3325, 1997.
S. Waydo, A. Kraskov, R. Q. Quiroga, I. Fried, and C. Koch. Sparse representation in the human medial temporal lobe. Journal of Neuroscience, 26(40): pp. 10232-10234, 2006.
E. T. Rolls and A. Treves. The relative advantages of sparse vs distributed encoding for associative neuronal networks in the brain. Network 1, pp. 407-421, 1990.
L. Fei-Fei, R. Fergus and P. Perona. Learning generative visual models from few training examples: an incremental Bayesian approach tested on 101 object categories. IEEE. CVPR 2004, Workshop on Generative-Model Based Vision, 2004, pp. 1-9.
O'Reilly, R.C., Wyatte, D., Herd, S., Mingus, B., & Jilk, D. Recurrent processing during object recognition. Frontiers in Psychology, 4(124), pp. 1-14, 2013.
R.-E. Fan, K.-W. Chang, C.-J. Hsieh, X.-R. Wang, and C.-J. Lin. Liblinear: A Library for Large Linear Classification, Journal of Machine Learning Research 9, pp. 1871-1874, 2008.

* cited by examiner

| Layer 1 | Sparse Coding 702 | Gabor 704 |
|---|---|---|
| Dictionary 712 | Unsupervised learning 64 atoms | Gabor wavelets, 64 complex atoms with 4 scales and 16 orientations 706 |
| Feature Extraction 714 | Sparse codes | Filtering 708 |
| Results | | |
| Raw accuracy 716 | 96.74% | 93.89% |
| 3D voting accuracy 718 | 97.5% | 95.5% |

FIG. 7

| Sparse Coding Innovation | VMR Benefit |
|---|---|
| Use dictionary activations based on nonlinear sparse coding as inputs to Leabra Vision layer instead of raw pixel values | Robust generalization and fingerprinting which allows outlier objects to be recognized and matched against the database |
| Optimize dictionary elements for the object class and its context by learning from unlabeled scene examples. | Learning method that can use context and task-specialized representations to generalize from a small number of labeled examples |
| Represent scene in terms of dictionary elements that are grouped to form invariant responses | Object representation scheme that is robust to visual nuisance factors such as changes in lighting, rotation angle, and scale |
| | Large reduction in training examples |
| Use top-down signals from associative memory to bias and select dictionaries for specific tasks | Improved performance for object localization, segmentation, and recognition using specialized visual dictionaries |

FIG. 10

| Leabra Vision Innovation | VMR Benefit |
|---|---|
| "Object-Centers" semantic map | Enables localization (estimating a bounding box) of objects in the presence of clutter by explicitly learning the positions of the detected local patterns relative to the object centers in training, and using it to predict the object center in novel images. |
| "Silhouettes" semantic map | Enables segmentation (estimation of the silhouettes) of objects in the presence of clutter by explicitly learning the expected mask over the support (NxN pixel area) of each detected pattern, given the object identity and the location and strength of the detected pattern. |
| Leabra architecture that combines error-driven and Hebbian learning | Simple and non-parametric learning of model layers that enable object recognition, localization and segmentation with low computational complexity for large numbers of object classes |
| Combination of bottom-up data and top-down hypothesis driven processing via the associative memory layer | • Enhanced object semantic labeling by incorporating contextual and link information from other VMR modules |
| Semantic feedback from object naming layer to lower representation layers | • Improved accuracy and speed of object recognition, localization, and segmentation by utilizing hypotheses generated from learned statistics. |

FIG. 11

| Associative Memory Innovation | VMR Benefit |
|---|---|
| Complementary learning architecture which combines hippocampus learning with medial temporal lobe learning | • Fast single shot learning of memories with good pattern separation<br>• Integrative learning for generalization of associations, linked memories, and pattern completion |
| Adaptive recall using variable inhibition | • More robust pattern completion<br>• Generation of N-best matching memories for an input |
| Linking of temporal memory trajectories | Enables processing of dynamic video events on variable time-scales |
| Memory consolidation using interference reduction | • Maintains fast recall performance as memories are added<br>• Reduces need for iterative recalls for finding matches<br>• Increases memory capacity |

FIG. 12

| Brain Area | Memory Function | Learning Rate | Learning Rule | Representation | Benefit |
|---|---|---|---|---|---|
| Hippocampus | Episodic Recall | High/One-shot | Hebbian | Sparse, Non-overlapping | Pattern Separation |
| Medial Temporal Lobe (MTL) | Generalization | Slow | Error Driven | Distributed, overlapping | Familiarity, Invariance |

FIG. 13

METHOD AND APPARATUS FOR SPARSE ASSOCIATIVE RECOGNITION AND RECALL FOR VISUAL MEDIA REASONING

CROSS-REFERENCE TO RELATED APPLICATIONS

This is a Non-Provisional patent application of U.S. Provisional Application No. 62/235,931, filed in the United States on Oct. 1, 2015, entitled, "Method and Apparatus for Sparse Associative Recognition and Recall for Visual Media Reasoning," the entirety of which is incorporated herein by reference.

BACKGROUND OF THE INVENTION

(1) Field of Invention

The present invention relates to a system for visual media reasoning and, more particularly, to a system for visual media reasoning using sparse associative recognition and recall.

(2) Description of Related Art

Object recognition is the task of finding a given object in an image or video sequence. Conventional object recognition (the "what" problem) in the presence of common visual nuisance factors, such as variability in viewpoint, noise, clutter, and partial occlusion is inefficient and inaccurate and requires large training sets to learn specific appearances. Several approaches, including both neuro-inspired and traditional vision systems, are capable of recognizing approximately 100 different categories of objects (e.g., ~75% probability detection). However, these images do not contain nuisance factors. In addition, methods for recognizing outlier objects without prior models are training sample intensive and brittle.

In order to answer "who", "what", "where", and "when" questions about images and videos, scene context in the form of spatial and temporal relationships and object and activity semantics must be brought to bear. Existing methods are lacking in their use of these factors. For example, temporal context makes use of specific object identity (i.e., "have I seen a similar object previously?"), which requires the ability to remember related concepts and features and efficiently recall them under noisy and partial occlusion conditions. Associative memories developed for this task are brittle; they have low capacity, so they do not scale to problem sizes of interest. Below is a summary of the limitations of the current state-of-the-art in visual media reasoning.

With regards to the field of object recognition, non-sparse image descriptors are less robust to sparse noise sources (e.g., occlusion, clutter) (see the List of Cited Literature References, Literature Reference Nos. 4, 16, and 18). Sparse code learning is a non-deterministic polynomial-time (NP)-hard optimization problem (see Literature Reference No. 8). Furthermore, learning the parameters of object recognition typically requires large numbers of training examples (i.e., greater than 1000) (see Literature Reference No. 39). Additionally, typical semantic-context based systems use probabilistic models that roll up samples into statistics, losing ability to "back-track" or explain results (see Literature Reference Nos. 41 and 42).

With regards to current art in the field of spatiotemporal associative memory, standard approaches cannot find matches for noisy, partial, or overlapping patterns. Furthermore, bidirectional associative memory (BAM) and Hopfield networks have relatively low memory capacities (see Literature Reference Nos. 44). While the original hippocampal model (see Literature Reference Nos. 19, 20, 21, 22, 31, and 43) has superior recall capability, it generalizes poorly, recalling the closest episode, relevant or not. Finally, online memory models typically suffer from forgetting the oldest sample observed (i.e., forgetting factor).

Each of the prior methods described above exhibit limitations that make them incomplete. Thus, a continuing need exists for a visual media reasoning system and method that assists analysts in rapidly extracting relevant information from images or video by learning the associations between "who", "what", "when", and "where" from a single example, and then using feedback from the associations to improve recognition accuracy.

SUMMARY OF THE INVENTION

The present invention relates to a system for visual media reasoning and, more particularly, to a system for visual media reasoning using sparse associative recognition and recall. The system comprises one or more processors and a memory having instructions such that when the instructions are executed, the one or more processors perform multiple operations. An input image having input data is filtered using a non-linear sparse coding module and a first series of sparse coding filter kernels tuned to represent objects of general categories, followed by a second series of sparse coding filter kernels tuned to represent objects of specialized categories, resulting in a set of sparse codes. Object recognition is performed on the set of sparse codes by a neurally-inspired vision module to generate object and semantic labels for the set of sparse codes; Pattern completion is performed on the object and semantic labels by a spatiotemporal associative memory module to recall relevant meta-data in the input image. Bi-directional feedback between the non-linear sparse coding module, the neurally-inspired vision module, and the spatiotemporal associative memory module is used to fuse the input data with the relevant meta-data. An annotated image with information related to who is in the input image, what is in the input image, when the input image was captured, and where the input image was captured is generated.

In another aspect, a user can provide input by selectively activating specific object or semantic label neurons in the neurally-inspired vision module.

In another aspect, novel activation patterns are used to direct user attention to areas of the input image considered relevant, which are recalled from stored knowledge in the spatiotemporal associative memory module.

In another aspect, the non-linear sparse coding module comprises a hierarchical chain of a plurality of base model layers, wherein within each base model layer there is a sparse-coding process and a saliency-weighted pooling process, and wherein an output of each base model layer is used as an input to the next base model layer in the hierarchy.

In another aspect, bidirectional feedback comprises signals for a specialization feedback process, an attentional feedback process, and a pattern refinement and retrieval process, and wherein user input may be provided to any of the processes.

In another aspect, predictions on ambiguous or missing information in the input data are generated; previously observed patterns that are similar to patterns in the input data are retrieved; and the fusion of the input data with the relevant meta-data is refined.

As can be appreciated by one skilled in the art, the present invention also comprises a method for causing a processor to perform the operations described herein.

Finally, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 7 is a table of results from a comparison of Gabor filtering and sparse coding according to embodiments of the present disclosure;

FIG. 10 is a table illustrating innovations based on the use of sparse coding according to embodiments of the present disclosure;

FIG. 11 is a table illustrating innovation to the Leabra model according to embodiments of the present invention;

FIG. 12 is a table illustrating innovative use of neuro-inspired models according to embodiments of the present disclosure; and FIG. 13 is a table illustrating complementary properties of the hippocampus and medial temporal lobe (MTL) for associative memory improve recall according to embodiments of the present disclosure.

DETAILED DESCRIPTION

Figure 1:
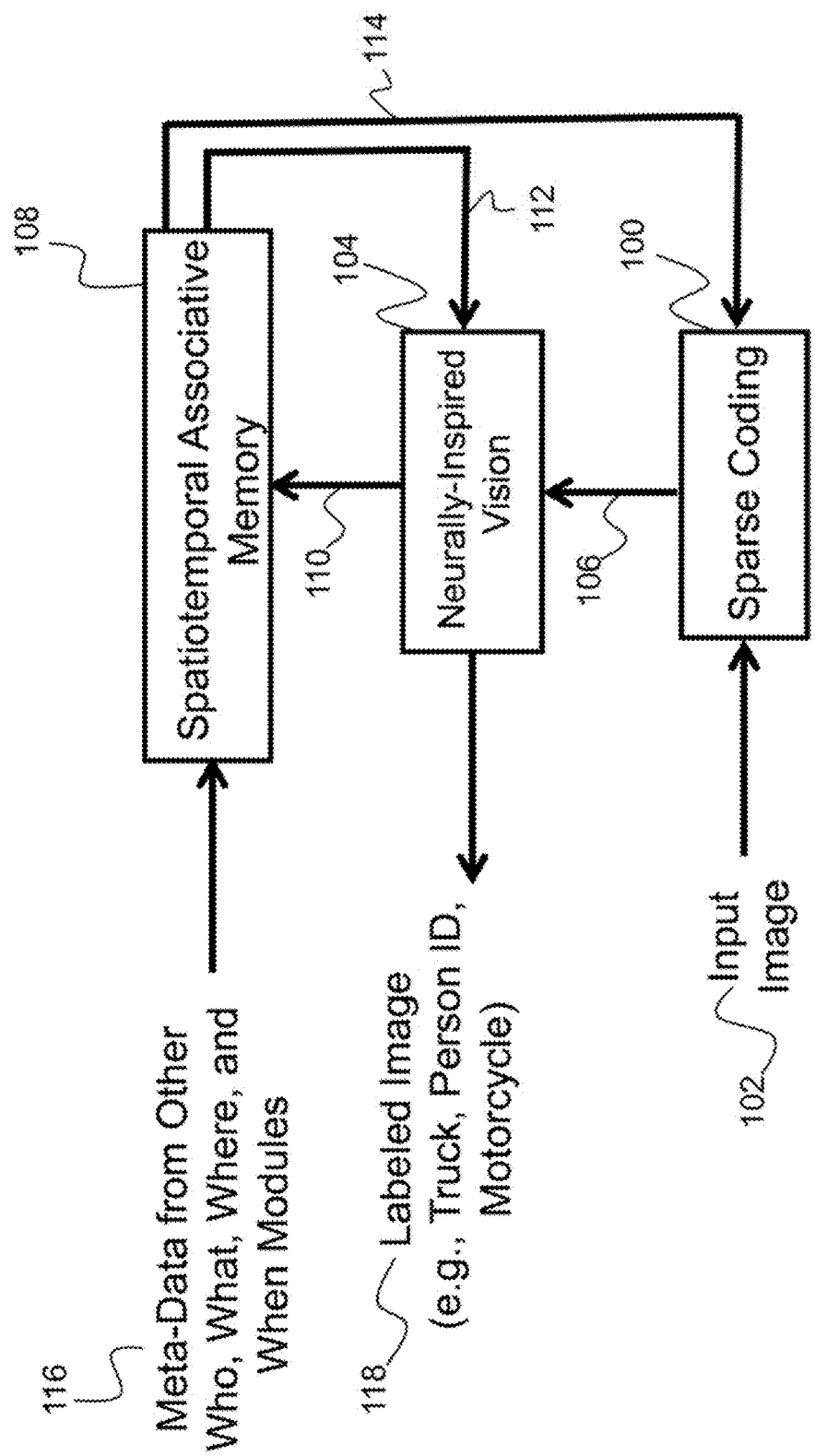
FIG. 1 is an illustration of the architecture of the sparse associative recognition and recall (SPARR) system according to embodiments of the present disclosure.

The present invention relates to a system for visual media reasoning and, more particularly, to a system for visual media reasoning using sparse associative recognition and recall. The following description is presented to enable one of ordinary skill in the art to make and use the invention and to incorporate it in the context of particular applications. Various modifications, as well as a variety of uses, in different applications will be readily apparent to those skilled in the an, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Subsequently, an introduction provides the reader with a general understanding of the present invention. Finally, specific details of the present invention are provided to give an understanding of the specific aspects.

(1) LIST OF CITED LITERATURE REFERENCES

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. P. Felzenszwalb, R. Girshick, D. McAllester, and D. Ramanan, "Object Detection with Discriminatively Trained Part-Based Models," in IEEE Trans. On Pattern Anal. And Machine Intell., 32(9):1627-1645, 2010.
2. L. Bourdev and J. Malik, "Poselets: body part detectors training using 3D human pose annotations," in ICCV, 2009.
3. Y. LeCun, F. Huang, and L. Bottou, "Learning Methods for Generic Object Recognition with Invariance to Pose and Lighting," in CVPR, 2004.

4. J. Mutch, and D. Lowe, "Object class recognition and localization using sparse features with limited receptive fields," in Int. J. Comp. Vision, 80(1):45-57, 2008.
5. T. Serre, L. Wolf, S. Bileschi, M. Roesenhuber, and T. Poggio, "Robust object recognition with cortex-like mechanisms," in IEEE Trans. on Pattern Anal. and Machine Intell., 29(3):411-426, 2007.
6. R. Salakhutdinov and G. E. Hinton, "Deep Boltzmann machines," in AISTATS, 2009.
7. H. Zuo and T. Hastie, "Regularization and variable selection via the elastic net," J. Royal Stat. Soc.: Series B, 67:301-320, 2005.
8. H. Lee, A. Battle, R. Raina, and A. Ng, "Efficient sparse coding algorithms," Proc. of NIPS, 2006.
9. M. Aharon, M. Elad, and A. Bruckstein, "K-SVD: An Algorithm for Designing Overcomplete Dictionaries for Sparse Representation," in IEEE Trans. on Signal Processing, 54(11):4311-4322, 2006.
10. Q. Geng and J. Wright, "On the Local Correctness of L1 Minimization for Dictionary Learning," in Proc. of IEEE International Symposium on Information Theory (ISIT), 3180-3184, 2014.
11. K. Jarret, K. Kavukcuoglu, M. Ranzato, and Y. LeCun, "What is the best multi-stage architecture for objection recognition," in ICCV, 2009.
12. J. Yang and M.-H. Yang, "Learning Hierarchical Image Representation with Sparsity, Saliency and Locality," in BMVC, 2011.
13. R. Achanta, S. Hemani, F. Estrada, and S. Susstrunk, "Frequency-tuned salient region detection," in CVPR, 2009.
14. N. Pinto, D. Cox, J. Dicarlo, "Why is real-world visual object recognition hard?" PloS Comp. Bio., 4(1)e27+, 2008.
15. H. Lee, R. Grosse, R. Ranganath, and A. Ng, "Convolutional deep belief networks for scalable unsupervised learning of hierarchical representations, in ICML, 2009.
16. M. Zeiler, D. Krishnan, G. Taylor, and R. Fergus, "Deconvolutional networks," in CVPR, 2009.
17. S. Lazebnik, C. Schmid, and J. Ponce, "Beyond bag of features: Spatial pyramid matching for recognizing natural scene categories," in CVPR, 2006.
18. J. Yang, K. Yu, Y. Gong, and T. Huang, "Linear spatial pyramid matching using sparse codings for image classification," in CVPR, 2009.
19. O'Reilly, R. C., Wyatte, D., Herd, S., Mingus, B. & Jilk, D. J. Recurrent Processing during Object Recognition. Frontiers in Psychology, 4, 124, 2013.
20. R. O'Reilly, "Biologically plausible error-driven learning using local activation differences: The generalized recirculation algorithm," in Neural Computation 8: 895-938, 1996.
21. R. O'Reilly, "Six principles for biologically-based computational models of cortical cognition," in Trends in Cognitive Sciences, 2:455-462, 1998.
22. R. O'Reilly and Y. Munakata, "Computational Explorations in Cognitive Neuroscience: Understanding the Mind by Simulating the Brain," The MIT Press, Cambridge, Mass., 2000.
23. R. M. Harlick and L. G. Shapiro, Image Segmentation Techniques, Computer Vision Graphics, Image Processing, 1(29):10-132, 1985.
24. J. Shi and J. Malik, "Normalized Cuts and Image Segmentation," in IEEE Trans. on Pattern Anal. and Machine Intell., (27):888-905, 1997.
25. L. Itti, C. Koch, "Computational Modeling of Visual Attention," in Nature Reviews Neuroscience, 2(3):194-203, 2001.
26. D. Martin, C. Fowlkes, and J. Malik. "Learning to Detect Natural Image Boundaries Using Local Brightness, Color and Texture Cues," in IEEE Trans. on Pattern Anal. and Machine Intell. 26(5), 2004.
27. A. Torralba, "Contextual Priming for Object Detection," Int. J. Comp. Vision 53(2):169-191, 2003.
28. B. Leibe, A. Leonardis, and B. Schiele, "Combined Object Categorization and Segmentation with an Implicit Shape Model," in ECCV Workshop on Stat. Learning in Comp. Vision, 2004.
29. L. Itti, C. Koch, E. Niebur, "A Model of Saliency-Based Visual Attention for Rapid Scene Analysis," in IEEE Trans. on Pattern Anal. and Machine Intell., 20(11):1254-1259, 1998.
30. K. A. Norman, & R. C. O'Reilly, Modeling hippocampal and neocortical contributions to recognition memory: a complementary-learning-systems approach Psychological review, 110, 611-646, 2003.
31. R. C. O'Reilly, R. Bhattacharyya, M. D. Howard, N. Ketz, "Complementary Learning Systems", Cognitive Science, 38, 1229-1248, 2014.
32. R. Bhattacharyya, M. D. Howard, "ICArUS-MINDS Monthly Research and Development Report," IARPA Award D10-PC20021, August 2010.
33. J. E. Lisman, & A. A. Grace, The Hippocampal-VTA Loop: Review Controlling the Entry of Information into Long-Term Memory Neuron, 46, 703-713, 2005.
34. K. A. Norman; E. L. Newman, & A. J. Perotte, Methods for reducing interference in the Complementary Learning Systems model: Oscillating inhibition and autonomous memory rehearsal Neural Networks, 18, 1212-1228, 2005.
35. K. A. Norman, How hippocampus and cortex contribute to recognition memory: Revisiting the complementary learning systems model Hippocampus, Wiley Subscription Services, Inc., A Wiley Company, 20, 1217-1227, 2010.
36. C. Lebiere, C. Gonzalez, & M. Martin, Instance-based decision-making model of repeated binary choice Proceedings of the 8th International Conference on Cognitive Modeling, 2007.
37. M. D. Howard, R. Bhattacharyya, R. C. O'Reilly, G. Ascoli, J. M. Fellous. "Adaptive Recall in Hippocampus", in proceedings BICA 2011 Conference, November 2011.
38. J. Triesch, C. Eckes, "Object Recognition with Deformable Feature Graphs: Faces, Hands, and Cluttered Scenes", in Handbook of Pattern Recognition and Computer Vision, 3' ed., World Scientific Publishing Co., pgs. 461-480, 2005 (Ed: C. Chen).
39. A. Bosch, A. Zisserman, and X. Munoz. Image classification using random forests and ferns. In Proc. ICCV, 2007.
40. Blei, David M.; Ng, Andrew Y.; Jordan, Michael I. Lafferty, John. ed. "Latent Dirichlet allocation". Journal of Machine Learning Research 3 (4-5): pp. 993-1022. doi: 10.1162/jmlr.2003.3.4-5.993, 2003.
41. Divvala, S. K., Hoiem, D., Hays, J. H., Efros, A. A., & Hebert, M. An empirical study of context in object detection. In Computer Vision and Pattern Recognition, 2009. CVPR 2009. IEEE Conference on (pp. 1271-1278). Presented at the Computer Vision and Pattern Recognition. CVPR 2009. IEEE Conference on. doi:10.1109/CVPR.2009.5206532, 2009

42. Galleguillos, C., & Belongie, S. Context based object categorization: A critical survey. Computer Vision and Image Understanding, 2010.
43. O'Reilly, R. C. & McClelland, J. L. Hippocampal Conjunctive Encoding, Storage, and Recall: Avoiding a Tradeoff. Hippocampus, 4, 661-682, 1994.
44. Wei, Gang and Zheyuan Yu, Storage Capacity of Letter Recognition in Hopfield Networks, doi 10.1.1.14.6879, 2007.
45. Pedro F. Felzenszwalb, Ros B. Girschick, David McAllester, Cascade Object Detection with Deformable Parts Models. In Proc. IEEE CVPR 2010.
46. Lisman, J. E. Role of the dual entorhinal inputs to hippocampus: a hypothesis based on cue/action (non-self/self) couplets, Progress in brain research 163, 615-625, 2007.
47. O'Keefe J, Recce M L: Phase relationship between hippocampal place units and the EEG theta rhythm. Hippocampus, 3:317 330, 1993.
48. Skaggs W E, McNaughton B L, Wilson M A, Barnes C A: Theta phase precession in hippocampal neuronal populations and the compression of temporal sequences. Hippocampus, 6:149 172, 1996.
49. B. A. Olshausen and D. J. Field. Emergence of simple-cell receptive field properties by learning a sparse code for natural images. Nature, 381:607609, 1996.
50. B. A. Olshausen and D. J. Field. Sparse coding with an overcomplete basis set: A strategy employed by V1? Vision Research, 37:33113325, 1997.
51. S. Waydo, A. Kraskov, R. Q. Quiroga, I. Fried, and C. Koch. Sparse representation in the human medial temporal lobe. Journal of Neuroscience, 26(40): 10232-10234, 2006.
52. E. T. Rolls and A. Treves. The relative advantages of sparse vs distributed encoding for associative neuronal networks in the brain. Network 1, 407-421, 1990.
53. L. Fei-Fei, R. Fergus and P. Perona. Learning generative visual models from few training examples: an incremental Bayesian approach tested on 101 object categories. IEEE. CVPR 2004, Workshop on Generative-Model Based Vision, 2004.
54. O'Reilly, R. C., Wyatte, D., Herd, S., Mingus, B., & Jilk, D. Recurrent processing during object recognition. Frontiers in Psychology, 4(124), 1-14, 2013.
55. R.-E. Fan, K.-W. Chang. C.-J. Hsieh, X.-R. Wang, and C.-J. Lin. LIBLINEAR: A Library for Large Linear Classification, Journal of Machine Learning Research 9, 1871-1874, 2008.

(2) PRINCIPAL ASPECTS

The present invention has three "principal" aspects. The first is a system for visual media reasoning. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for visual media reasoning. The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e., computer operations coded into a computer chip). The "instructions" may be stored on any non-transitory computer-readable medium such as a floppy disk, a CD-ROM, a flash drive, and in the memory of a computer.

(3) INTRODUCTION

Conventional object recognition and visual reasoning approaches are lacking when common visual nuisance factors, such as variability in viewpoint, noise, clutter and partial occlusion, are present. Furthermore, conventional approaches require large training sets to learn specific appearances. In contrast, the hybrid math and neuroscience-based architecture according to embodiments of the present disclosure comprehensively addresses the problem of determining what is in the image (or video) as well as how information about who, where, and when can be leveraged.

The following is a summary of the limitations of the current state-of-the-art, and the corresponding approach and advantages of the present invention. Each of the approaches will be described in detail below. In the prior art, non-sparse image descriptors are less robust to sparse noise sources (e.g., occlusion, clutter) (see Literature Reference Nos. 4, 16, and 18). In the invention of the present disclosure, image descriptors are constructed from sparse codes. Sparse code is a kind of neural code in which each item is encoded by the strong activation of a relatively small set of neurons.

In the prior art, sparse-code learning is a non-deterministic polynomial-time (NP)-hard optimization problem (see Literature Reference No. 8). In the system according to embodiments of the present disclosure, sparse codes are learned by relaxing the L0-optimization to an L1 regularized with an L2-norm term, and graphics processing unit (GPU) hardware is leveraged to quickly compute the coordinate descent solver. Additionally, algorithmic and specialized GPU hardware allows fast learning of sparse codes.

In the prior art, learning the parameters of object recognition typically requires large numbers of training examples (i.e., greater than 1000) (see Literature Reference No. 39). However, in the invention described herein, sparse coding studies showed state-of-the-art performance with fewer than one hundred training samples. The hierarchical structure of repeating sparse coding base models of the present invention eliminates the need for many training samples.

Additionally, typical semantic-context based systems use probabilistic models that roll up samples into statistics, losing ability to "back-track" or explain results (see Literature Reference Nos. 41 and 42). By using episodic memory, decisions made to refine estimates point to specific examples, giving rise to refinement. The system is capable of explaining reasoning of output to a user.

With regards to current art in the field of spatiotemporal associative memory, standard approaches cannot find matches for noisy, partial, or overlapping patterns. In the present invention, hippocampus models uniquely fill in missing patterns while separating similar patterns. This improves recognition performance for partially occluded and missing information.

In the prior art, bidirectional associative memory (BAM) and Hopfield networks have relatively low memory capacities (see Literature Reference Nos. 44). While the original hippocampal model (see Literature Reference Nos. 19, 20, 21, 22, 31, and 43) has superior recall capability, it generalizes poorly, recalling the closest episode, relevant or not. The system according to embodiments of the present disclosure starts with pattern completion from one memory system aiding recall in the other with recall and familiarity confidence measures. Adaptive recall mechanisms allow the recall of several memories with variable degrees of interpolation.

Finally, online memory models typically suffer from forgetting the oldest sample observed (i.e., forgetting factor). However, in the system described herein, memory consolidation processes from sleep reorganize memory during offline states to minimize interference from pattern overlap and optimize recall. This increases effective capacity and enables robust one-shot learning.

Described in further detail below is a method and system for recovering information pertaining to a photo or video about when it was taken, what is contained within, who is present, and where was the picture taken using sparse associative recognition and recall for visual media reasoning. The method and system is referred to as sparse associative recognition and recall, or SPARR. It can be implemented as a software system that will assist human analysts in rapidly extracting mission-relevant information from photos or video. This task is referred to as visual media reasoning (VMR). It includes reasoning with image content and preliminary annotations (e.g., who is in the photo?) to fully recover the 4 W's: "who", "what", "where", and "when".

SPARR leverages fundamental breakthroughs in neural models for vision and associative memory as well as the mathematics of compressed sensing to greatly improve the accuracy, efficiency, and scope of image analysis. This framework for recognition learns to associate and understand meaning (i.e., who, what, where, and when) in a scene or video, and makes use of the rigorous mathematical theory of sparse coding to improve accuracy and enable learning from a small number of examples.

In an embodiment, the invention assists human analysts in rapidly extracting mission-relevant information from photos or video (i.e., perform the VMR task). SPARR learns associations between who, what, where and when information from a single example, and then uses feedback from these associations to dramatically improve recognition accuracy by a factor of two for images and video with difficult real-world artifacts, which will be described in detail below.

(4) SPECIFIC DETAILS (4.1) Sparse Associative Recognition and Recall (SPARR) Architecture SPARR processes input imagery and video from raw pixels to specific objects, rapidly learns associations between regions of images, and cross-connects the layers to improve performance and efficiency. In experimental studies, this resulted in at least 50% fewer recognition errors in determining what is in an image or video based on the image or video alone. Improving the determination of what is in an image or video also depends greatly on additional context in the form of metadata evidence for answering who, where and when questions. A spatiotemporal associative memory layer of the present invention provides the means to exploit this metadata to perform link analysis, pattern completion, and improve lower level recognition performance.

As depicted in FIG. 1, the SPARR architecture comprises three tightly coupled layers that make use of bidirectional feedback between layers. Briefly, the lowest layer, a sparse coding layer 100, outputs a set of sparse codes 106 (or features) that can be used to represent the input image 102 with respect to a learned dictionary upon which the second layer (neurally-inspried vision layer 104) performs object recognition. The second layer 104 provides object and semantic labels 110 upon which the third layer 108 performs pattern completion to recall relevant meta-data. The lowest layer is a sparse coding layer 100. At the sparse coding layer 100, a sparse coding subsystem learns visual dictionaries from unlabeled data of an input image 102. The visual dictionary entries are grouped to form invariances. Nonlinear sparse decoding is used to represent image information of objects using a small number of specialized (i.e., task-relevant) dictionary elements (sparse codes). The nonlinearity of sparse coding in the sparse coding layer 100 allows the modeling of a rich set of object properties for recognition while discounting extraneous information.

The sparse coding subsystem of the sparse coding layer 100 greatly increases the representation power in the input of the middle, neurally-inspired vision layer 104. In this layer, the local, error-driven and associative, biologically realistic algorithm (Leabra) Vision model of biological vision developed by O'Reilly and colleagues (see Literature Reference No. 22) is leveraged. It is a model of learning which is a balance between Hebbian and error-driven learning with other network-derived characteristics. The Leabra Vision model is used to mathematically predict outcomes based on inputs and previous learning influences. The Leabra Vision model has been demonstrated to have high performance on large image sets. However, as can be appreciated by one skilled in the art, other neurally-inspired learning models could be utilized. In the neurally-inspired vision layer 104, novel activation patterns can be used to direct user attention to certain areas of the image considered relevant, recalled from stored knowledge in the hippocampus.

The neurally-inspired vision layer 104 recalls the spatial arrangements of features with a hippocampus exposed to images of objects by introducing feature location along with local image feature activation patterns. This provides a mechanism to locate an object given the observed patterns in the image. Using memorized locations of local image features for each object, the system recalls the most similar set of image features and their locations. Additionally, the neurally-inspired vision layer 104 determines whether a local image feature resides in the foreground our background of the image by introducing a variable in the hippocampus model and recalling the value given the local image features. This provides a mechanism to segment the object given the observed patterns in the image. Segementaion is a finer localization of the object in the image by estimating a contour around just the object itself, over just a bounding box.

Furthermore, the present invention utilizes bidirectional feedback between the layers, including bottom-up feedback 106. A key innovation of bottom-up feedback 106 of the present invention (i.e., from the lower, sparse coding layer 100 to the middle, neurally-inspired vision layer 104) is to replace the Gabor filter feature extraction layer of Leabra Vision with a hierarchical nonlinear sparse coding system of the sparse coding layer 100. The hierarchical nonlinear space coding system was proposed by Yang and colleagues (see Literature Reference No. 12) and will be described in detail below. This greatly increases the capability of Leabra Vision to represent task-relevant information for recognition while de-emphasizing extraneous information, such as orientation and illumination changes, and requiring fewer examples for training.

The top layer of the SPARR architecture is composed of a bio-inspired spatiotemporal associative memory (SAM) layer 108 which leverages validated models of the hippocampus and medial temporal lobe (MTL). Bidirectional feedback 110 and 112 between the neurally-inspired vision layer 104 and the SAM layer 108 takes advantage of the hippocampus model's ability to complete patterns, recall spatial arrangements of features, localize objects, perform segmentations, and form associations between the SPARR output (i.e., annotated images with who, what, where, and when information).

In the following sections each of the components of SPARR is described in further detail. First, the use of bidirectional feedback between the subsystems (i.e., layers) for improved prediction of object labels, localization, and segmentation, as well as discovering links between entities found by other modules that cannot be found using a purely bottom-up, data-driven approach, is described. Then, the use of a hierarchical sparse coding subsystem to implement nonlinear sparse coding of input images is presented, followed by a description of the Leabra Vision model and spatiotemporal associative memory subsystems.

(4.1.1) Bidirectional Feedback

Bidirectional feedback is critical to fusing input data with hypotheses (context) to improve prediction of various quantities of interest, such as object labels, location and segmentation. Bidirectional feedback also provides natural linkage points for interaction with analysts, since these points are where new information is injected into the layers. Referring to FIG. 1, bidirectional feedback 106, 110, 112, and 114 in SPARR is implemented as a neural-inspired mechanism that fuses input data 102 (e.g., sensor images, bounding boxes, labels, meta-tags) with hypotheses, context, or predictions of these inputs and other intermediate quantities, predicted by the SAM layer 108. The memory model of the SAM layer 108 learns to predict these quantities by memorizing a set of meta-data 116 (i.e., meta-tag-annotated images). This interaction between data and hypothesis-driven processing refines its estimates of who, what, where and when in the following three ways. First, the system specializes feature extraction modules to subtasks in the sparse coding layer 100 and the neurally-inspired vision layer 104. Second, the system makes robust predictions on ambiguous or missing information in the input data 102, such as occlusions, dark shadows, lost resolution in the neurally-inspired vision layer 104 and the spatiotemporal associative memory layer 108. Third, the system discovers links by retrieving similar previously observed patterns that would otherwise be lost through a purely data-driven approach in the sparse coding layer 100, the neurally-inspired vision layer 104, and the spatiotemporal associative memory layer 108.

Figure 2:
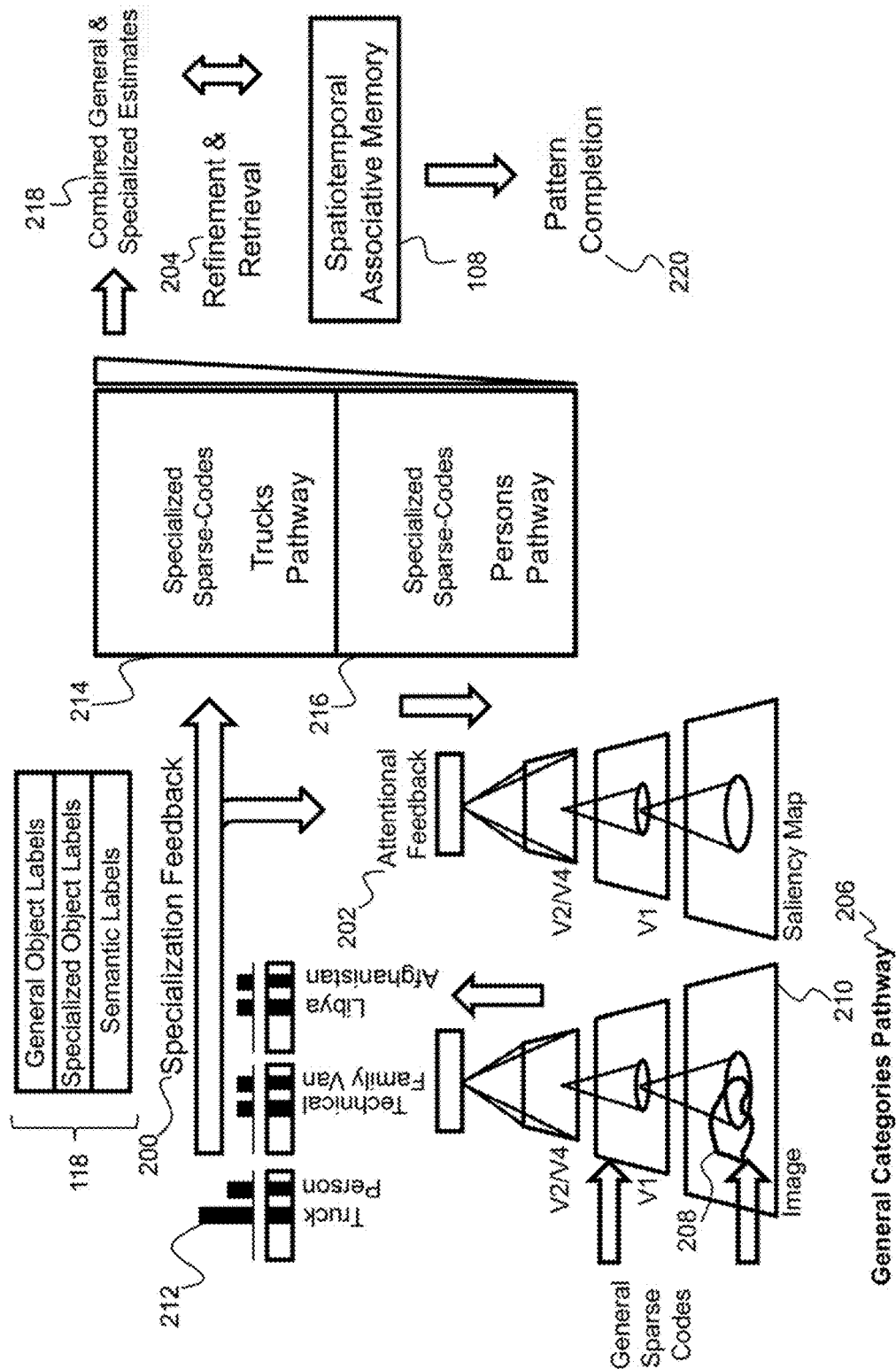
FIG. 2 is an illustration of bidirectional feedback in the SPARR system according to embodiments of the present disclosure.

FIG. 2 illustrates how bidirectional feedback takes the form of signals for specialization feedback 200, attentional feedback 202 (i.e., foreground/background separation and object localization), and pattern refinement and retrieval 204 in the present invention. Human input may be provided to SPARR at any of these points. SPARR uses a general-purpose dictionary that can represent broad classes of natural images as a linear combinations of image prototypes called atoms, as well as specialized dictionaries that can learn and leverage task-specific structural relationships (i.e, sparse, low-rank) between image prototypes. The decision to use any of these dictionaries is automatically made by bidirectional feedback through the network model. In FIG. 2, V1, V2, and V4 represent visual areas in the visual cortex in the mammalian visual pathway.

Starting with a general-purpose model (i.e., general categories pathway 206), the model predicts the existence of a certain coarse object category (e.g., truck 208) in an image 210. The activation of the truck node (as indicated by a higher "truck" bar 212 compared to the "person" bar) feeds back through the model as a specialization signal (i.e., specialized feedback 200), to activate an alternative truck dictionary 214 (e.g., truck type, to be used on a specialized pass). The process is repeated with possibly a third different specialization 216 (e.g., for persons) of a specialization pathway. The repetition may continue until the activations themselves begin to repeat, and no new hypotheses are generated. Specialization can be applied not only to the recognition task but also localization and segmentation. Different object-center distributions that are associated with the dictionary of patches may also be switched with specialized ones to look for smaller objects or disambiguating types of the same object class or identity. Likewise, local masks associated with the dictionary of patches may be switched with specialized ones to draw a contour around finer objects, as described below.

The generalized and specialized estimates are combined 218, and the combination undergoes refinement and retrieval 204 using the SAM layer 108. A second form of feedback in the present invention leverages a pattern completion feature 220 of the SAM layer 108 to enable robust predictions in the presence of ambiguities and missing data, and discovery of links that would have been impossible without the use of feedback.

Based on previous observations (i.e., training data) of images with semantic labels (i.e., annotated answers to all or some questions regarding who, what, where, when), or labeled images with associations (FIG. 1, element 118) from the neurally-inspired visual layer (FIG. 1, element 104), the SAM layer (FIG. 1, element 108) can predict with a certain confidence the semantics given a novel input image 102. These semantics (FIG. 1, labeled image with associations 118), which are in the form of activations of neurons that represent time, place, identity and object label, are fed back (FIG. 1, feedback 112) to the neurally-inspired vision layer (FIG. 1, element 104) and interpolated with the label's values computed with the input image (FIG. 1, element 102) from the bottom up. The combined result represents the fusion of input data with hypotheses from memory for refining (FIG. 2, refinement and retrieval 204) the who, what, where and when estimates (FIG. 1, meta-data 116). That is, occluded objects are filled in with the model's best guess about its appearance. Alternatively, resolution is increased in regions of the image, and new objects are introduced that have previously been associated with the objects contained within. The latter would trigger further investigation by a human analyst involving retrieving the original image that influenced the model association. In this way of explanation by recall or retrieval, feedback discovers (or supports the analyst to discover) new links that would have been lost without feedback.

Bidirectional feedback enables an elegant solution to using multiple sets of features in general and specialized versions of the VMR tasks: recognition, localization, and segmentation. It enables top-down influences derived from previously observed and learned multi-modal patterns to refine estimates in the presence of clutter, noise, or partial information, such as having only image input (as opposed to, for example, image plus annotations input).

(4.1.2) Sparse Coding Layer

Bio-inspired Leabra Vision neural architectures are attractive for VMR applications because they mimic human perception and memory formation processes, including one-shot learning of associations between multiple semantic descriptor types using the model of the hippocampus. It is well known that these capabilities normally come at the price of high computational complexity. As described above, the present invention improves both the scaling and generalization properties of the Leabra Vision architecture for VMR "what" analysis by using a sparse coding layer in place of the conventional Gabor filters that normally pre-process the input image.

It is well-known that sparse representations and codes are used throughout the brain (see Literature Reference Nos. 49, 50, and 51). Advantages of sparsity in the brain include increased storage capacity, improved discrimination, and more efficient processing (see Literature Reference No. 52). In the invention described herein, the utilization of sparsity is amplified in SPARR by combining nonlinear sparse coding results based on compressive sensing theory with Leabra Vision. Sparse coding improves the performance and scaling of the neural layers for VMR object recognition by preferentially representing task-relevant information and incorporating prior knowledge and knowledge from other VMR modules. Features of the sparse coding approach include, but are not limited to the following.

The sparse coding approach encapsulates task-relevant information using visual dictionaries enabling learning and generalization from far fewer examples. Additionally, nonlinear sparse coding based on L1 minimization results in highly compressed representations that eliminate non-sparse task-irrelevant information. Learning hierarchical groupings of visual dictionaries from unlabeled data increases representation power by incorporating invariance to image nuisance factors. Furthermore, top-down saliency feedback from the neural layers (and indirectly from other VMR modules) can be used to bias dictionary activations for optimum representation of task-relevant information in the input image.

(4.2) Architecture of the Sparse Coding Layer

Figure 3:
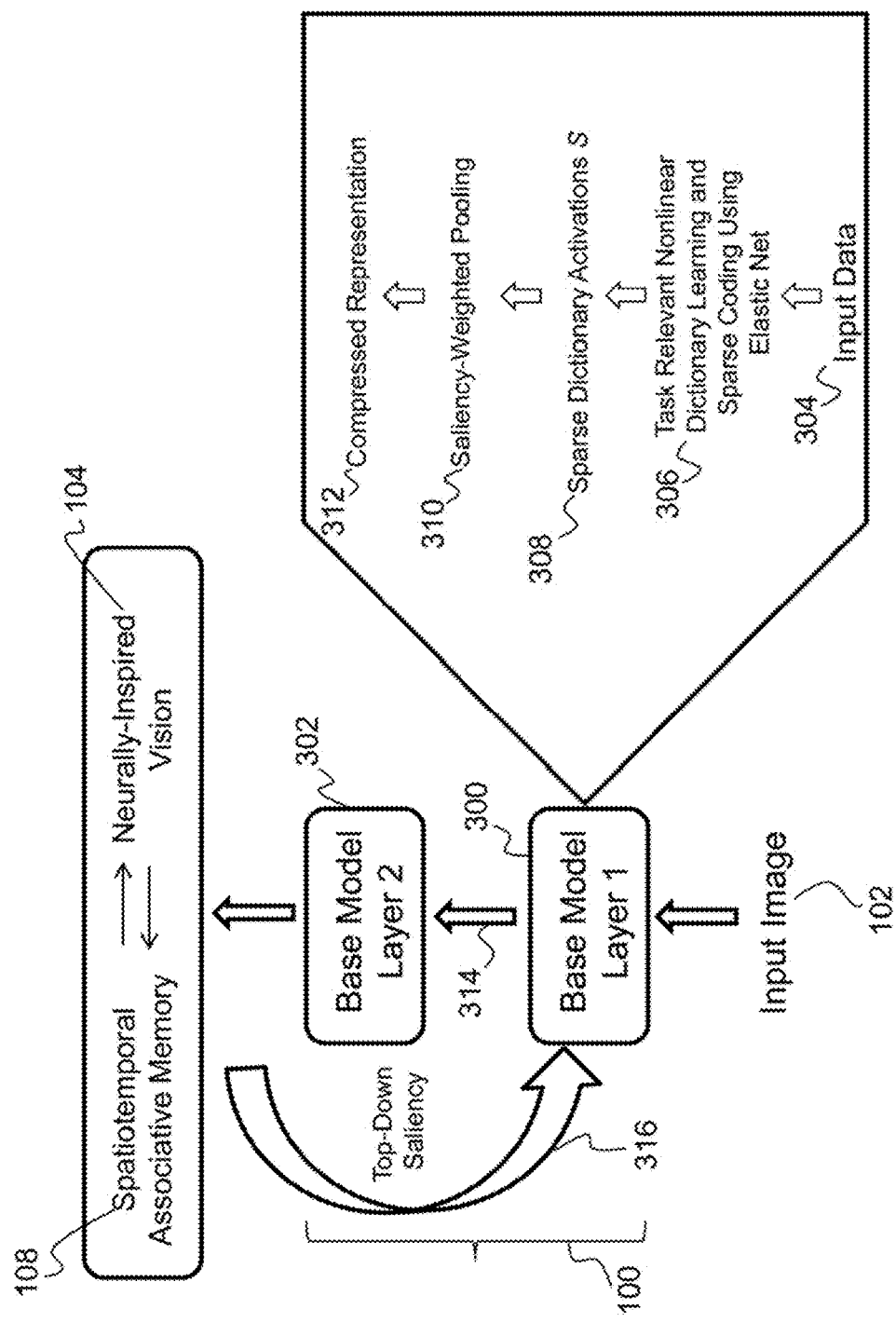
FIG. 3 is an illustration of the sparse coding layer of the SPARR system according to embodiments of the present disclosure.

As illustrated in FIG. 3, the sparse coding layer 100 comprises a hierarchical chain of multiple base model layers (e.g., base model layer 1 300 and base model layer 2 302), where within each base model layer (e.g., base model layer 1 300), input data 304 undergoes task relevant nonlinear dictionary and sparse coding using the elastic net method (i.e., sparse coding step 306). The elastic net method (see Literature Reference No. 7) is a regularized regression method that overcomes the limitations of the LASSO (least absolute shrinkage and selection operator) method. The sparse coding step is followed by sparse dictionary activation 308, saliency-weighted pooling 310, and compressed representation 312. Compressed representations 312 can be described as expressing a signal as a weighted combination of a fixed set of basic components or "basis vectors" which has been optimized to minimize the number of nonzero weights needed to reconstruct a general type or class of signals. If the representation is sparse (e.g., the number of nonzero weights is much smaller than the number of basis vectors), then the signal has been highly compressed. Sparse representations are useful because they indicate that the basis vectors have been tailored for a particular class of signals. Nonlinear sparse coding is the term for the general class of methods for generating such sparse representations. Nonlinear sparse coding methods are based on minimizing the L1 norm of the vector of weights or basis vector coefficients, where the L1 norm is defined as the sum of the absolute values of the vector elements. It is well-known that minimizing the L1 norm results in sparse representations of signals.

The output 314 of a base model layer (e.g., base model layer 1 300) is used as input to the next base model layer (e.g., base model layer 2 302) in the hierarchy. In this deep learning-based hierarchical framework, the atoms of higher layer dictionaries represent more complex and nuisance-invariant visual patterns.

(4.2.1) Sparse Coding

In the sparse coding step 306, given a specialized visual dictionary $B=[b_1, b_2, \ldots, b_k] \in \mathbb{R}^{d \times k}$. The dictionary B is represented as a real-valued (denoted by $\mathbb{R}$) matrix of size d×k, where each of the k columns represents a d-dimensional dictionary atom, the sparse coding $s \in \mathbb{R}^k$ of an input signal $x \in \mathbb{R}^d$ (either a raw image patch or a feature "patch" from a lower base model layer) can be found by solving the following elastic net problem (see Literature Reference No. 7):

$$S(x,B)=\mathrm{argmin}_s \|x-Bs\|_2^2+\gamma\|s\|_1+\lambda\|s\|_2^2,$$

where argmin denotes the argument of the minimum, $\|\bullet\|_2^2\|$ represents the squared Euclidean norm, $\|\bullet\|$ represents the L1-norm (absolute sum of entries), $\gamma$ and $\lambda$ are parameters used to provide different weights for different terms in the optimization, and S represents sparse dictionary activations (element 308). The training data $\{x_i\}$ are randomly sampled from the lower layer (or raw image). This nonconvex optimization problem can be solved with alternating minimization by iterating between the following two steps:

1. Solve the elastic net for each training data by fixing the dictionary B.
2. Update the dictionary B by the Lagrange dual method (see Literature Reference No. 8) given the sparse codes $\{s_i\}$.

Alternative dictionary learning methods (e.g., K-SVD (see Literature Reference Nos. 9 and 10) can also be used to construct a more effective set of visual dictionaries. SVD stands for Singular Value Decomposition. The K-SVD uses SVD to construct a dictionary that can represent images as a sparse linear combination of dictionary atoms, where the sparse coding only has K nonzero coefficients. Organizing the dictionary into groups of atoms that are invariant to various visual nuisance factors, such as changes in illumination, rotation angle, and scale, leads to far fewer training examples and makes representation of objects more robust.

(4.2.2) Saliency-Weighted Pooling

In the saliency-weighted pooling 310 step, the sparse codes generated for every overlapping patch in the image can be sensitive to variations (e.g., slight translation or rotation) and noise. To alleviate this, max pooling functions are used, which can robustly characterize the statistics of sparse codes within local image regions (see Literature Reference No. 11), extract translation invariant distinctive features from the sparse codes, and reduce the dimensionality of the feature set.

The working domain is partitioned into a set of M non-overlapping pooling sub-windows, and the max pooling function is computed for a sub-window $\Delta$ as $p(S_\Delta)=\max_\Delta$ ($|S_A|$), where $S_A$ is the sparse codes of an input image partitioned into sub-window of size $\Delta$. Real-world object images almost always have irrelevant regions (e.g., background, non-target objects, clutter) that may have large, sparse coefficients encoding non-essential information. To cope with this problem, a max pooling function weighted by a saliency map (saliency-weighted pooling 310) was introduced that helps the pooling operation focus on distinctive and relevant features and improves the ability to represent the target.

The saliency-weighted max pooling is computed as $p(S_A) = \max_A(|S_A \cdot w|)$, where w represents weights that are larger for salient foreground pixels in the image and smaller for irrelevant background pixels. FIG. 3 illustrates the saliency-weighted pooling 310 in the working domain. The saliency map (i.e. compressed representation 312) can be obtained in a bottom-up fashion (from other vision layers in the VMR framework) or in a top-down saliency 316 fashion (as feedback from the neurally-inspired visual layer 104 and spatiotemporal associative memory layer 108).

(4.3) Neurally-Inspired Visual Layer

Through a series of hierarchically arranged connections, competitive dynamics and a combination of error-driven (supervised) and Hebbian (unsupervised) learning, the neurally-inspired visual layer of the present invention (e.g., Leabra Vision model) showed state-of-the-art object recognition performance (i.e., 92.6% correct on 100 classes) over many nuisance factors, such as changes in position, scale, degree of occlusion, and image quality (see Literature Reference No. 19). Moreover, Leabra Vision (LVis) is highly compatible with alternate feature-extraction and contextual-cueing modules, including those specialized for spatiotemporal patterns. In addition to providing object and semantic labeling of objects, the present invention boosts system speed and accuracy through simultaneous localization and segmentation of objects.

Object recognition for a large set of classes requires generic, but discriminative, feature extraction. As originally designed, Leabra Vision (LVis) used a set of Gabor filters to extract features from images. Although Gabor filters are generic enough to represent a large number of objects, they are not specific enough to create discriminative representations across the smaller set of objects that are operationally relevant for the VMR problem. For example, previous studies have shown that sparse coding features tuned for specific objects of interest improved classification rates by a factor of about 1.36 with respect to untuned bio-inspired feature detection methods (see Literature Reference No. 12).

The error-driven learning inherent to Leabra Vision (LVis) can leverage sparse coding features without specific engineering or tuning (see Literature Reference Nos. 20, 21, and 22) and can outperform other bio-inspired object recognition algorithms (see Literature Reference No. 1). Leabra Vision also overcomes nuisance factors not handled by the sparse coding subsystem as well as performs pattern recognition on spatiotemporal sparse-coding features. Classification rates are further improved by choosing different sparse dictionaries based on general classification results. For example, a blurry image may be initially recognized to contain a truck. Based on this information, the classification result can be improved with a dictionary better suited to distinguish between civilian and technical (e.g., military) trucks.

In addition to providing object labels, the present invention leverages the ability of the Leabra Vision (LVis) system to recover preliminary semantic information. Here the semantic features encode who, where, what, and when information. These semantic features are provided by preliminary analysis from other layers, in addition to results recalled from the spatiotemporal associative memory layer, and are used to top-down bias the Leabra Vision network to focus the object-recognition process. Top-down biases have been shown to improve classification by up to 19%, especially when heavy occlusion or noise is introduced (see Literature Reference No. 1). Furthermore, semantic features can be inferred from never-before-seen objects, leading to a rough classification and recovery of mission-relevant features. The authors of Literature Reference No. 19, for example, demonstrated that by presenting images, object labels, and semantic features for known objects, bidirectional connections from IT and semantic label layers allow generalization to never-before-seen images. IT is a label that refers to inferotemporal area in the mammalian visual pathway.

Localizing and segmenting images is crucial for object recognition, particularly in cluttered scenes. Typical approaches to localization use sliding windows that repeatedly compute the same intermediate results. Typical approaches to segmentation use low-level features to either grow or split regions (see Literature Reference No. 23, 24, 25, and 26). To boost object localization speed and accuracy, the present invention introduces spatial priors for object types (see Literature Reference No. 27) and creates a neural implementation of the generalized Hough transform (see Literature Reference No. 28) with a more flexible graphical representation (see Literature Reference No. 38). Spatial priors have been shown to increase speed 20% by biasing a search to those areas that typically contain a particular object of interest (see Literature Reference No. 45); this method can also be augmented by low-level saliency methods (see Literature Reference No. 29).

Figure 4:
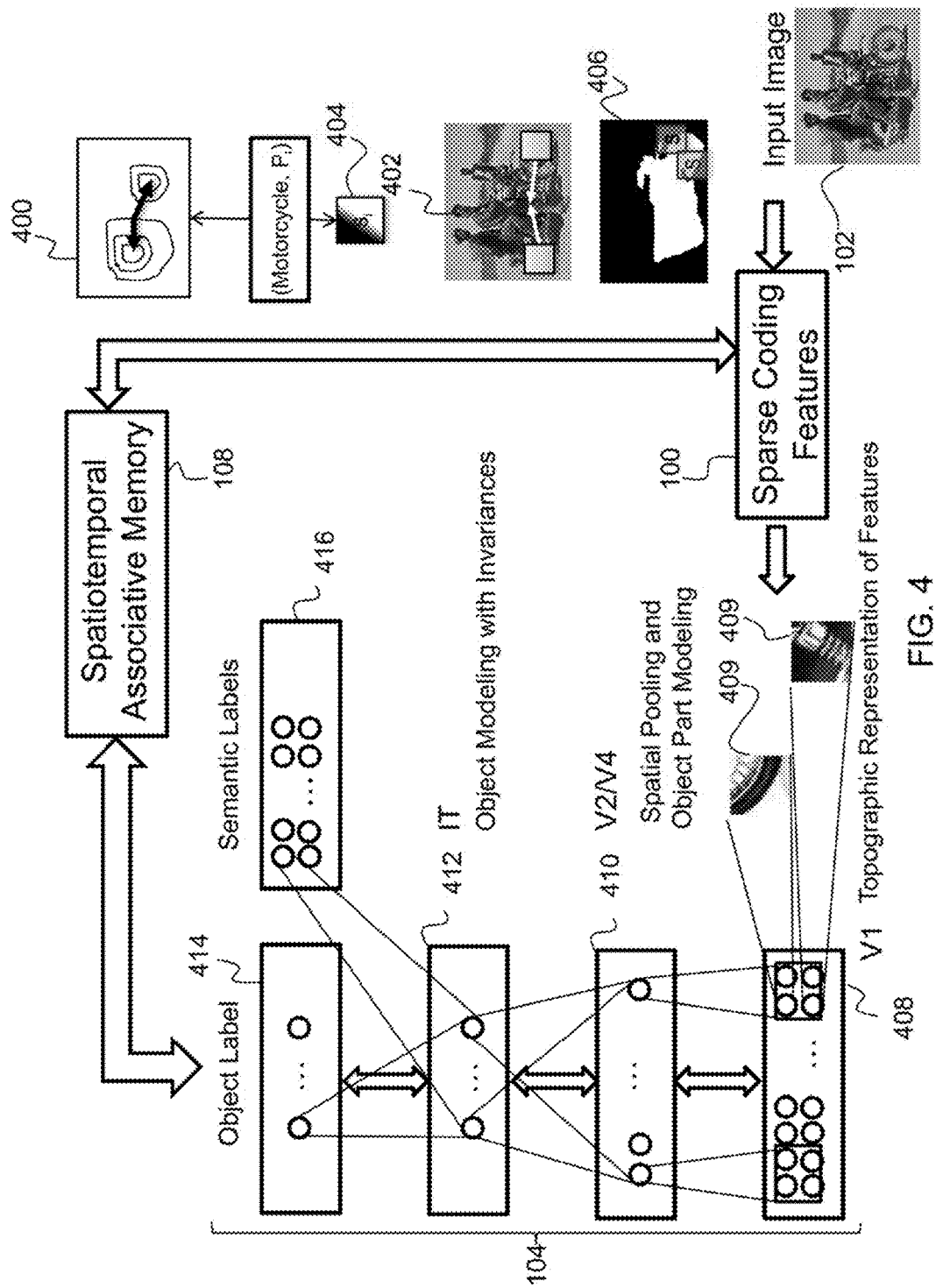
FIG. 4 is an illustration of the neurally-inspired vision layer of the SPARR system according to embodiments of the present disclosure.

As depicted in FIG. 4, the generalized Hough transform is implemented in the following manner: each object is broken into a constellation of parts (e.g., face, eyes, nose, mouth, ears). Each of these parts' locations relative to an object center is represented as a probability distribution of normalized distances and orientations (e.g., eyes are 5% of patch width above face centers) (represented by element 400). During training, a bidirectionally connected associative network learns the joint distribution of object parts and relative location. During testing, as each object part is identified, it casts a vote as to the predicted object center through the bidirectional associative network. These predicted object center offsets are accumulated for a more robust estimate of object location with an object-center semantic 402 (see Literature Reference No. 11). Object-center semantic maps enable 402 localization (i.e., estimating a bounding box) of objects in the presence of clutter by explicitly learning the positions of the detected local patterns relative to the object centers in training, and using the positions to predict the object center in novel images.

Using a graphical representation boosts a pixel-based representation of object center offsets by providing greater generalization over absolute pixel coordinates (see Literature Reference No. 38). The present invention also enables improved performance on articulated objects (e.g., faces, bodies, tools with joints). Similar to the object center map, each V1 receptive field image patch also has a silhouette map associated with it, conditioned on object type 404. During testing, output from the object layer intersects with the input image to create an approximate foreground-background segmentation 406. Through bottom-up/top-down iterative processing, this segmentation finds the most consistent interpretation of data against hypotheses. Rapid localization and segmentation, in turn, boosts object recognition by suppressing clutter and other nuisance factors. Silhouette semantic maps enable segmentation (i.e., estimation of the silhouettes) of objects in the present of clutter by explicitly learning the expected mask over the support (N×N pixel area) of each detected pattern, given the object identity and the location and strength of the detected pattern.

Although the Leabra Vision system has already shown state-of-the-art performance in object recognition across many classes (e.g., 92.6% correct on 100 classes) the enhancements of the present invention lead to more accurate classification by providing more discriminative features (including semantic features) and employing rapid object localization and segmentation techniques. Through bidirectional interactions between the neurally-inspired visual layer 104 (i.e., Leabra Vision), the sparse coding layer 100, and the spatiotemporal associative memory layer 108, the invention described herein enables more accurate identification than feed-forward models alone. The authors of Literature Reference No. 19 provide details on many of the components of FIG. 4, but for completeness, they are described below. V1 408 represents the first layer of features used in the Leabra Vision system; it uses sparse coding features 100 and the image is divided topographically across each neuron (i.e., circle) in this layer into topographic representations of features 409. V2/V4 410 represents the second layer of features used in the Leabra Vision system; each neuron in this layer pools the responses of several V1 408 neurons to provide object part modeling. IT 412 represents the third layer of features used in the Leabra Vision system; each neuron in this layer pools the responses of several V2/V4 410 neurons to provide object modeling with invariances. The outputs of IT 412 include object labels 414 and semantic labels 416.

Relative to the original Leabra Vision system (see Literature Reference No. 19), innovations of the present invention include use of more discriminative task-specific sparse coding features, integration of contextual cues from the hippocampal associative memory module (i.e., SAM layer 108), and efficient methods to localize and segment objects. Object-center and silhouette maps are extensions to the Leabra Vision system. Conditioning image patches (V1 receptive fields) on object type creates a hypothesis of where object centers and extents occur. Through the interaction between training assumptions and testing images, spatial pooling enhances localization and segmentation while suppressing clutter and other nuisance factors.

(4.4) Spatiotemporal Associative Memory Layer

A large capacity bio-inspired model of spatiotemporal associative memory, capable of one-shot learning, provides the system with the ability to create distinct, but linked memories. These memories can serve as contextual cues for Leabra Vision processing and initial association of cues (e.g., start of link analysis). Furthermore, the associations retrieved from the module are retrieved in roughly constant time regardless of the number of stored memories, and can be adjusted for specificity or amount of interpolation. To date, no computational models of memory have successfully demonstrated human level performance. Recent neuroscience findings provide a strong foundation for the development of a SAM modeled after the human hippocampus and medial temporal lobe that scales to human performance levels. The following section describes the four innovations to reach this goal and relevant neuroscience for each: complementary learning systems theory (CLS) (see Literature Reference No. 30), adaptive recall, spatiotemporal recall, and memory consolidation processes.

Link analysis requires reference to specific cases as well as general trends. As originally designed, the hippocampus model (see Literature Reference No. 30) relied on exemplar-based learning alone. The use of prototype-based learning, however, can lead to generalization to new situations and conversely perform anomaly detection. Innovations to extend the spatiotemporal associative memory for SPARR include integration of a complementary prototype-based memory module, the ability to titrate the number and specificity of recalled memories, extensions to the spatiotemporal domain, and larger capacity through offline memory reorganization.

Figure 5:
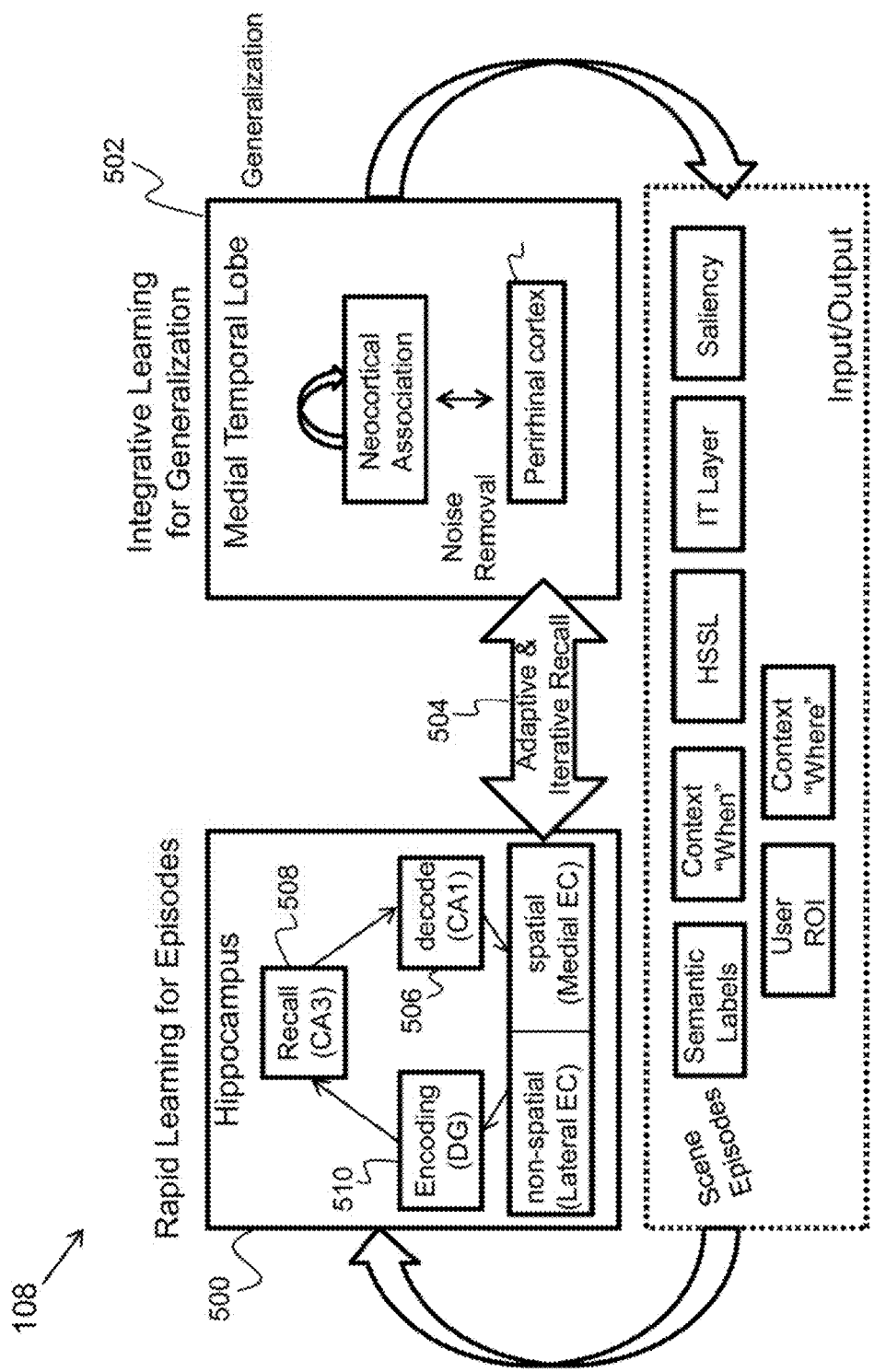
FIG. 5 is an illustration of the spatiotemporal associative memory layer of the SPARR system according to embodiments of the present disclosure.

FIG. 5 illustrates how the spatiotemporal associative memory (SAM) layer provides contextual cues for visual processing (Leabra Vision or LVis) and link analysis for preliminary meta-data. The CLS approach to modeling human memory addresses the diverse needs of a cognitive system to both 1) recall particular stimulus configurations as specific episodes with high accuracy; and 2) generalize across instances to recognize categories of information (see Literature Reference No. 30). The brain does this with specialized structures: 1) the hippocampus 500 for episodic recall; and 2) the medial temporal lobe (MTL) 502 for generalization. Both structures fuse the same multimodal information to form memories; however, the representations that underlie the memories and how they are learned differ in their properties. Typical associative memories (e.g., bidirectional associative memory (BAM), Hopfield networks) do not exploit the pattern separation architecture of the hippocampus 400 and, hence, have limited capacity.

An advantage of the present invention is that recall can be iterated from coarse to fine in the space of memories, much like hierarchical processing in Leabra Vision. For instance, if a noisy, occluded instance of a two-wheeled vehicle is encountered by the Leabra Vision system, the semantic layer activations reflect the existence of wheels and handlebars as retrieval cues. The MTL 502, having formed a representation of bicycles and motorcycles that share these features from many training examples, recalls this category from the semantic cues. In turn, this additional information from the MTL 502 can be used to aid the hippocampal recall of a particular motorcycle exemplar that was learned in one shot (i.e., a Honda CB500).

An initial associative memory system can easily recall what and where for many (e.g., one hundred) distinct memories that contain overlapping associations between them. In previous experimental studies by the inventors, it was demonstrated that models of the hippocampus can recall object categories using visual information from layer IT in Leabra Vision and spatial relationship information with 90% accuracy with 300 overlapping exemplars. Additionally, experimental studies by the inventors showed that the integrated hippocampus 500 and MTL 502 function as a CLS and can learn associations faster and with higher accuracy than with either system alone (see Literature Reference No. 31). In the present invention, CLS is expanded with innovations directly inspired by neurobiology by modeling mechanisms for adaptive recall and memory consolidation processes.

To be useful, link analysis modules must return a variable number of associations along with confidence measures. Typical data fusion methods (e.g., Kalman filters, Bayesian networks) are hand-tuned for each set of modalities and, consequently, do not generalize to other domains. Whereas the original hippocampus model (see Literature Reference No. 43) returned the closest episode, relevant or not, adaptive recall mechanisms allow the recall of several memories with variable degrees of interpolation. Adaptive and iterative recall 504 starts with pattern completion from one memory system (e.g., hippocampus 500), aiding recall in the other (e.g., MTL 502). However, this interaction requires separate measures of confidence from both systems to avoid false positives and hallucinations.

The MTL 502 has been previously modeled as separate neural structures: the perirhinal and para-hippocampal cortices to understand the relationship between pattern overlap, the amount of training, and recall confidence (see Literature Reference No. 32). In the present invention, the neural circuit that underlies recall confidence in the hippocampal 500 system (conversely used to signal novelty, involving area CA1 506 and the subiculum (see Literature Reference No. 33)) is modeled. These signals naturally scale as new modalities are added, such as "who," and increase the dimensionality of the memories.

In challenging situations, recall confidence may be low in noisy and uncertain data, however, it doesn't mean a familiar stimulus wasn't encountered. To adapt recall in the neural memory systems of the present invention, the occurrence of neural activations in the network is changed. To search for the right memory in the hippocampus 500, how sparsely the information is encoded early in the chain of activation can be varied. It has been previously demonstrated that decreasing sparseness by varying inhibition in the network in the face of high noise can help recall. In the present invention, inhibition for iterative retrievals is controlled by leveraging the internal recall confidence signals described above. When the very cues for recall are missing information themselves, the system can benefit from the pattern completion capabilities from both parts of the CLS, where the most common features are filled in by the MTL 502, and details are recalled by the hippocampus 500. To augment the function of the latter, the system uses neuro-modulation of the recurrent connections in layer CA3 508, the primary site of pattern completion for conjunctive memory in the hippocampus 500 to complete up to 75% missing information in input patterns. Clearly, in this more advanced use of memory where recalls are both adaptive and iterative (i.e., adaptive and iterative recall 504), it is important to avoid recalling the same information. Mechanisms at different levels of the architecture, such as inhibition of return through temporary synaptic depression for the neural weights that represent a memory, or modulation of leak currents at the single neuron level that reduce the probability of reactivation, can be employed to enable robust, adaptive recall.

Moreover, the SAM layer of the present invention addresses the ability to process video. Perhaps the simplest method to store spatiotemporal patterns is to concatenate semantic output from static frames into a single vector. This encoding may be sufficient for short video clips, but may not be robust to modest changes in sequence elements, time stretching or compression. Neurally speaking, back projections from Cornu Ammonis 3 (CA3) 508 to dentate gyrus (DG) 510 of the hippocampus 500 can cue the network to recall the next frame within a sequence (see Literature Reference No. 46) and are believed to be related to theta-phase precession (see Literature Reference Nos. 47 and 48). This encoding is more robust than simple concatenation, can recall videos regardless of starting point, and can even interpolate missing or noisy frames.

To be functional on real world data, the VMR problem requires the ability to effectively handle a multitude of memories. The capacity for memory in neural systems is large, due in part to active mechanisms that operate on memory representations to consolidate them during offline, or sleep states. A key function in consolidation is to store new information in a way that does not interfere with previous memories. This ensures that the strength of memories is normalized for unbiased recall and occurs offline so that volitional recall during a task is undisturbed. The present invention uses neuronal replay, where hippocampal 500 memories that were recently learned in one-shot are reactivated offline. This reactivation stimulates the MTL 502 to incorporate and update the generalized representations that support flexible recognition. As new information is integrated into long-term memory, it is important to normalize the strength of old memories compared to new ones. This ensures the efficient recall of specific old memories in a single pass instead of searching through several activated matches, this time in the hippocampus. This is done through the reactivation of stores within the CA3 508 subregion of the hippocampus 500 sparked by endogenous activity. An oscillation of inhibition during a recall mitigates the interference from competing memories (see Literature Reference Nos. 34 and 35). Recency can be given an excessively important weight in judging relevance (see Literature Reference No. 36).

(4.5) SPARR Information Flow Example

The following describes the information flow in SPARR using an example input image of a truck surrounded by people, some with weapons. In the system described herein, SPARR makes three passes through the system before arriving at a final estimate of the "what" information and its links with "who", "where", and "when" information generated by other VMR modules. In each successive pass, estimates are refined by both generating coarse-to-fine detail as well as fusing input-data-only-based estimates with hypotheses generated from learned experiences.

Figure 6:
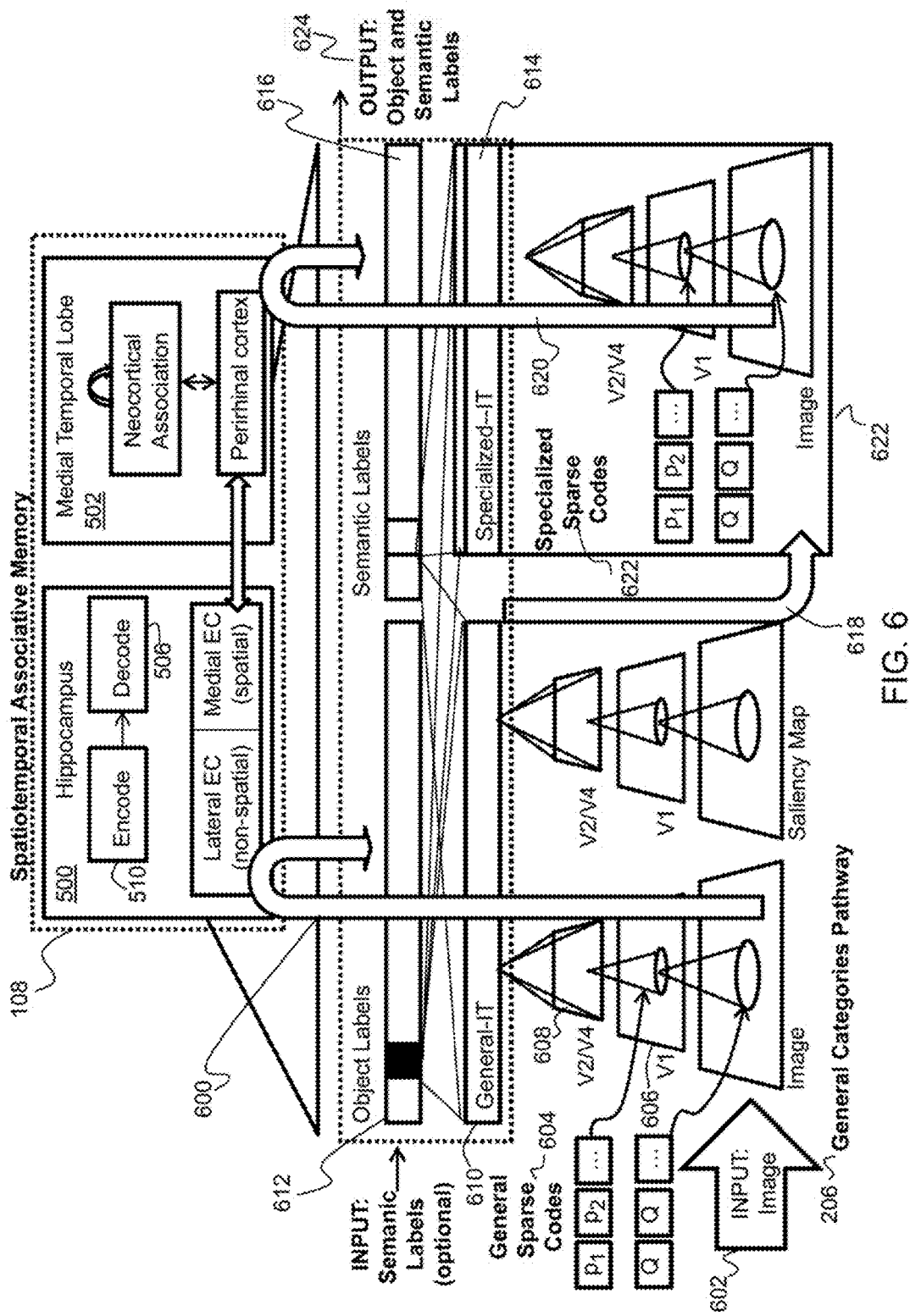
FIG. 6 illustrates information flow through the SPARR system according to embodiments of the present disclosure.

As shown in FIG. 6, in the first pass 600, the input image 602 is filtered by a series of general sparse coding subsystem-trained filter kernels tuned to robustly represent objects of general categories (e.g., cars, person, vegetation, motorcycle, sky, dirt) in a general categories pathway 206, similar to that depicted in FIG. 2. The filtered result (i.e., general sparse codes 604) represents the V1 layer 606 of the Leabra Vision model. The V1 activations are then used to compute the V2/V4 layer 608. Each neuron in the V2/V4 layer 608 is computed by taking a subset of V1 neurons or receptive field, scaling each neuron's output response by learned weights, taking the k highest activations within the receptive field, and summing them (i.e., k-winner-take-all (kWTA) approach as described in Literature Reference No. 22). The process is the same for every other neuron in V2/V4 layer 608, using the same learned weights, except the receptive field is slid over the V1 layer 606 spatially.

The whole process to compute V2/V4 from V1 is repeated for computing the IT layer 610 and the object labels layer 612 from the V2/V4 layer 608 and the IT layer 610, respectively. The general object labels layer 612 is the coarse categorization of objects in the image consisting of the set of objects the model is trained to learn. There is also a specialized object labels layer 614 and a semantics layer 616 which, as implied by its name, represent other more detailed information about the image (e.g., car model, person identity, plant type). The specialized object labels layers 612 are computed from both the general-IT layer 610 and a parallel specialized-IT layer 614. First, the specialized object labels layer 612 is filled in by the general-IT layer 610, then it is refined by the specialized-IT layer 610. Before the first pass 600 concludes, the object labels, semantics, and all IT activations are fed into the SAM model 108 to recall the closest previously image and semantics experience to generate a refined estimate or hypothesis of all upper layers: object labels, semantics, and IT activations. At the conclusion of the first pass 600, SPARR may predict the existence of a truck, person, and gun. At this point, there may also have been activation in a Libya ("where") neuron, based purely on the information given and determined so far.

On the second pass 618, the object label activations (i.e., truck, person, gun) are projected top-down to generate an "attentional" shroud (attentional feedback 202 in FIG. 2) over each object separately. This attentional shroud modulates the filter responses such that only the activated regions are strong enough to activate the layers above it on the next and final third pass 620, essentially focusing the attention of the hierarchy on specific regions of the image, determined by what general object category was found in the first pass 600. Furthermore, through the localization and segmentation augmentations of the Leabra Vision system, the object centers and the segments of the objects are also estimated. As the second pass 618 concludes, the object labels and semantics do not change. Instead, SPARR estimates the regions of the image containing the predicted general objects.

Finally, on the third pass 620, which is really several independent passes of the same nature, the specific object features are activated by similar processing done in the first pass 600 but via a specialized pathway 622 using specialized sparse features and updating the specialized-IT layer 614 and the object labels layers 612. This processing is done for the truck, person, and gun in the image, independently, and then combined at the IT layers, object labels layer 612, and the semantic labels layer 616. The final estimate including object and semantic labels 624 is generated after providing these activations to the SAM layer 108 for the final refinement of the now nearly complete estimate of who, what, where, and when information, given the input data 602.

At the output (i.e., object and semantic labels 624) of the third pass 620, the details will begin to appear. SPARR may determine via the specialized pathway 622 that the truck was actually a Toyota HiLux, contradicting initial user input that the vehicle was a Toyota Tundra, which is a reasonable user error, as the Tundra is the U.S. name for the HiLux. SPARR may determine that the people were not only rebels, but Libyan rebels based on the appearance of the people as memorized, recalled, and pattern-completed by the SAM layer 108 based on other previously observed data, such as previously annotated images. By the same mechanism, the model may determine that the location of this picture was Libya during the spring. As evidence for these predictions, the signature of the activation pattern that emerges at the upper layers (i.e., object labels layer 612, semantic labels layer 616, and IT activations) serves to retrieve previous stored images for the user as a proof of the predictions.

At multiple points along the process, the user may provide input to the SPARR system when performing recognition by selectively activating specific object or semantic label neurons in the upper layers or the attentional shroud. The SAM layer can latch the user-specified activations to prevent changes in the neuron value by appropriately controlling the learning rate. In this manner, the user-specified activations only influence the system predications and are not influenced by the system itself. This neuro-inspired mechanism enables the user to reject certain lines of inquiry that the system may suggest. The learning rate may be made non-zero if the user is unsure of the a priori semantic information provided, and allow the user-specified activation to be refined based on all the other information provided.

(4.6) Experimental Studies

Experimental studies were conducted to validate the feasibility of using math-based sparse dictionaries to improve performance of object recognition. Reduction to practice for the Leabra Vision and the SAM layer has been demonstrated elsewhere (see Literature Reference Nos. 19, 30, and 31).

The visual neural layer in the Leabra system, developed by O'Reilly and colleagues (see Literature Reference No. 22), uses Gabor filters at the input (i.e., retinal/lateral geniculate nucleus (LGN)) layer, and has demonstrated a 92.6% mean recognition rate on novel test items from a set of 1000 three-dimensional object models in 100 categories. In the experimental studies, sparse dictionary features learned from a set of image data with the Hierarchical model with Sparsity, Saliency, and Locality (HSSL) system of Yang and colleagues (see Literature Reference No. 12) were used, and the performance of the two approaches were compared with learned features versus Gabor filters. The learned sparse dictionary reduced the error rate for object recognition from 6.1% to 3.3% for 100 objects from the CU3D-100 dataset (see Literature Reference No. 54).

To verify the efficacy of the sparse coding layer in SPARR, the feasibility of the layer/module was tested on the Caltech 101 dataset (see Literature Reference No. 53) and the CU3D dataset (see Literature Reference No. 54). As described below, the results showed improvements of 5% to 15% in recognition rates. For both datasets, a hierarchy with two base model layers in the sparse coding layer was used. In the first base model layer, a learned dictionary with 64 atoms trained from 100,000 8×8 image patches randomly extracted from Caltech 101 images was utilized (see Literature Reference No. 53).

For an input image, the local sparse codes of each 8×8 overlapping patch in an input image was computed. The 64-dimension (D) sparse features within each 4×4 nonoverlapping window were max-pooled, and then the pooled features in each 4×4 overlapping window were grouped to form 1024-D feature vectors that were projected onto their 96 largest principal components using principal component analysis (PCA). The principal components of a set of data are the axes that can represent the largest variance in the data. PCA is a common dimensionality reduction technique. In the second base model layer, sparse codes for the 96-D features were obtained using a learned dictionary of 100,000 features trained from the first layer. The max-pooling operator was performed using a relevant saliency map (e.g., see Literature Reference No. 13) with 1×1, 2×2, and 4×4 sub-windows, and the sub-windows were grouped into a single feature vector for classification.

Additional experimental studies compared the sparse coding layer/module of the present invention with state-of-the-art object recognition algorithms using the Caltech 101 dataset (see Literature Reference No. 53). A training set of either 15 or 30 images randomly selected from each category was used, and all other images were tested. Experimental results were reported by repeating 10 trials with different random selections of training samples. The sparse coding layer/module was compared with bio-inspired methods (see Literature Reference Nos. 4, 5, and 14), deep learning methods (see Literature Reference Nos. 11, 15, and 16), and SIFT-based methods (see Literature Reference Nos.

17 and 18). The sparse coding module outperformed both the state-of-the-art bio-inspired and deep learning methods by 9%, and the leading SIFT-based approach by almost 3%.

Further experimental studies were performed using the CU3D dataset (see Literature Reference No. 54), and the results are shown in the table 700 in FIG. 7. The experiment compared the features learned from the sparse-coding layer 702 (i.e., dictionary learning and sparse codes) with Gabor wavelets 704, nonadaptive features used by the original Leabra Vision system (see Literature Reference No. 19), and many other bio-inspired object-recognition algorithms. Specifically, Gabor wavelets 706 and filtering 708 in the first layer (i.e., Layer 1 710) were replaced with the dictionary learning 712 and sparse-coding method 714 of the present invention.

A Gabor wavelet 706 bank was designed with four scales and 16 orientations for a total of 64 atoms, the same number of atoms as the learned dictionary 712 of the sparse-coding layer 702. Sparse coding and Gabor features were evaluated using a subset of the CU3D dataset containing nearly 4,000 images of three-dimensional object models from the Google™ SketchUp warehouse. The images were organized into 100 categories with an average of 9.42 exemplars per category. Since the images have clean backgrounds, there is no need to use a saliency map in the max pooling step. The experimental protocol used in Literature Reference No. 19 was followed; that is, two exemplars per category were randomly selected as test images, and the rest were used as training images with five-fold cross validation. The parameters for the sparse coding layer were the same ones used for the Caltech 101 database in Literature Reference No. 12. The large library for large linear classification (LIBLINEAR) package (see Literature Reference No. 55) was used to train linear classifiers for the 100-class 1 versus all categorization task. The two feature sets were compared using both raw classification accuracy 716 and three-dimensional voting accuracy 718, which is a simple method to collect the results for different viewpoint angles, as described in Literature Reference No. 19. The experimental results 720 in the table 700 showed that the sparse codes have almost half the error rate of Gabor wavelets. Specifically, the raw error rate with Gabor wavelets was 6.11 (100-93.89), while the raw error rate with sparse coding was 3.26 (100-96.74), which is approximately half of 6.11. For 3D voting, the numbers are 4.5 for Gabor wavelets and 2.5 for sparse coding.

Visual media reasoning has multiple applications, non-limiting examples of which include consumer modeling, surveillance, and use in unmanned aerial vehicles (UAVs). Additionally, the system is suitable for applications that require analyzing massive amounts of photo or video data and making sense of it. This invention can be integrated into these systems, as it is an all-software solution.

Figure 8:
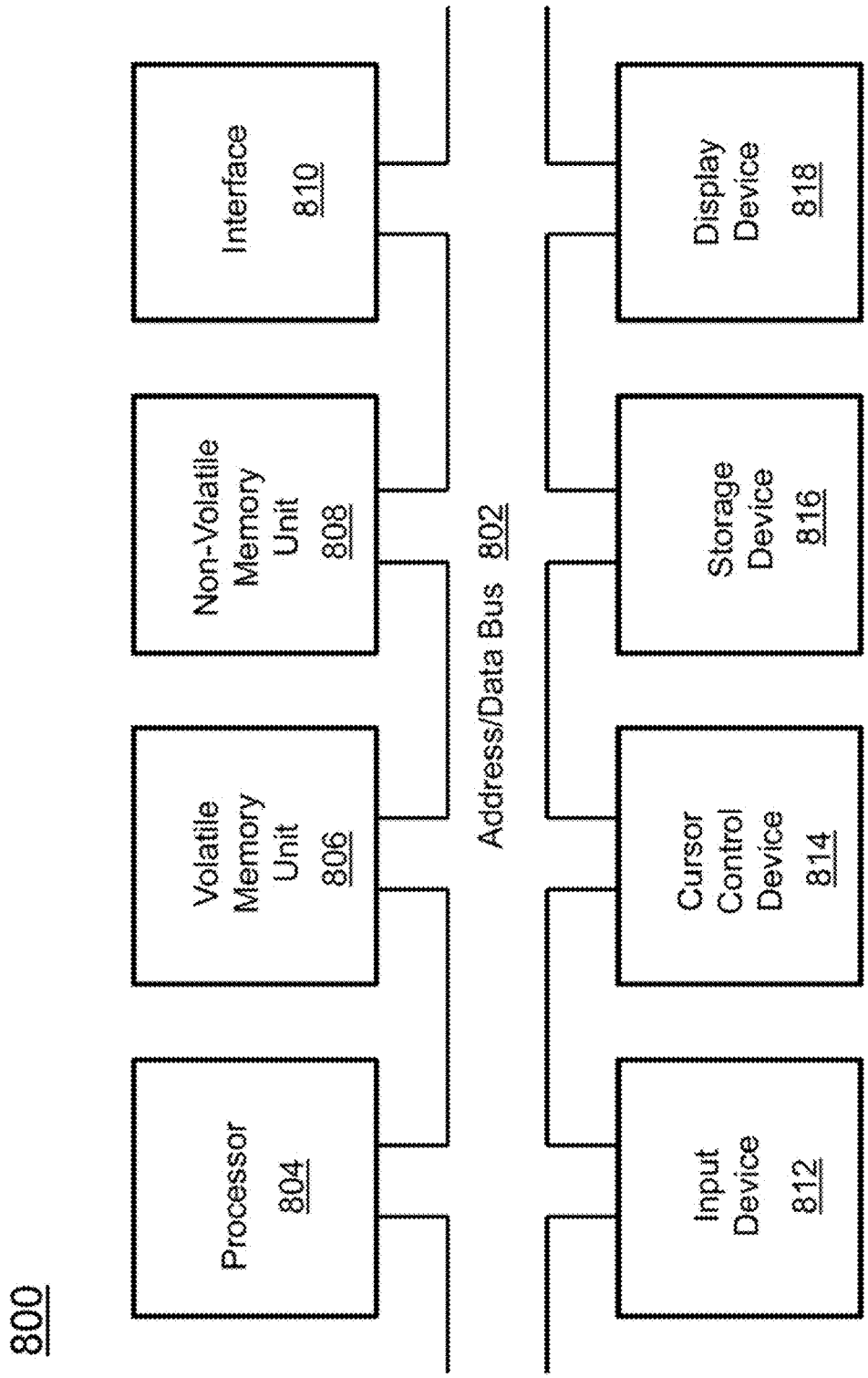
FIG. 8 is an illustration of a data processing system according to embodiments of the present disclosure.

An example of a computer system 800 in accordance with one aspect is shown in FIG. 8. The computer system 800 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 800. When executed, the instructions cause the computer system 800 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 800 is configured to utilize one or more data storage units. The computer system 800 may include a volatile memory unit 806 (e.g., random access memory ("RAM"), static RAM, dynamic RAM, etc.) coupled with the address/data bus 802, wherein a volatile memory unit 806 is configured to store information and instructions for the processor 804. The computer system 800 further may include a non-volatile memory unit 808 (e.g., read-only memory ("ROM"), programmable ROM ("PROM"), erasable programmable ROM ("EPROM"), electrically erasable programmable ROM "EEPROM"), flash memory, etc.) coupled with the address/data bus 802, wherein the non-volatile memory unit 808 is configured to store static information and instructions for the processor 804. Alternatively, the computer system 800 may execute instructions retrieved from an online data storage unit such as in "Cloud" computing. In an embodiment, the computer system 800 also may include one or more interfaces, such as an interface 810, coupled with the address/data bus 802. The one or more interfaces are configured to enable the computer system 800 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 800 may include an input device 812 coupled with the address/data bus 802, wherein the input device 812 is configured to communicate information and command selections to the processor 800. In accordance with one aspect, the input device 812 is an alphanumeric input device, such as a keyboard, that may include alphanumeric and/or function keys. Alternatively, the input device 812 may be an input device other than an alphanumeric input device. In one aspect, the computer system 800 may include a cursor control device 814 coupled with the address/data bus 802, wherein the cursor control device 814 is configured to communicate user input information and/or command selections to the processor 800. In one aspect, the cursor control device 814 is implemented using a device such as a mouse, a track-ball, a track-pad, an optical tracking device, or a touch screen. The foregoing notwithstanding, in one aspect, the cursor control device 814 is directed and/or activated via input from the input device 812, such as in response to the use of special keys and key sequence commands associated with the input device 812. In an alternative aspect, the cursor control device 814 is configured to be directed or guided by voice commands.

In one aspect, the computer system 800 further may include one or more optional computer usable data storage devices, such as a storage device 816, coupled with the address/data bus 802. The storage device 816 is configured to store information and/or computer executable instructions. In one aspect, the storage device 816 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 818 is coupled with the address/data bus 802, wherein the display device 818 is configured to display video and/or graphics. In one aspect, the display device 818 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 800 presented herein is an example computing environment in accordance with one aspect. However, the non-limiting example of the computer system 800 is not strictly limited to being a computer system. For example, one aspect provides that the computer system 800 represents a type of data processing analysis that may be used in accordance with various aspects described herein. Moreover, other computing systems may also be implemented. Indeed, the spirit and scope of the present technology is not limited to any single data processing environment. Thus, in one aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, one aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 9:
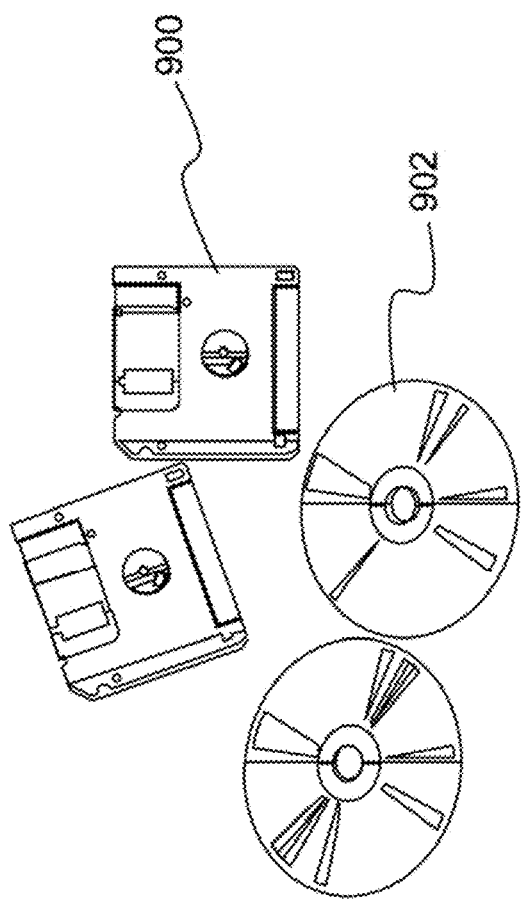
FIG. 9 is an illustration of a computer program product according to embodiments of the present disclosure.

An illustrative diagram of a computer program product embodying the present invention is depicted in FIG. 9. As a non-limiting example, the computer program product is depicted as either a floppy disk 900 or an optical disk 902. However, as mentioned previously, the computer program product generally represents computer readable code (i.e., instruction means or instructions) stored on any compatible non-transitory computer readable medium.

FIG. 10 is a table illustrating innovations based on the use of sparse coding according to embodiments of the present disclosure. FIG. 11 is a table illustrating innovation to the Leabra model according to embodiments of the present invention. FIG. 12 is a table illustrating innovative use of neuro-inspired models according to embodiments of the present disclosure. FIG. 13 is a table illustrating complementary properties of the hippocampus and medial temporal lobe (MTL) for associative memory improve recall according to embodiments of the present disclosure.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for visual media reasoning, the system comprising:
one or more processors and a non-transitory memory having instructions encoded thereon such that when the instructions are executed, the one or more processors perform operations of:
filtering an input image having input data using a non-linear sparse coding module and a first series of sparse coding filter kernels tuned to represent objects of general categories, followed by a second series of sparse coding filter kernels tuned to represent objects of specialized categories, resulting in a set of sparse codes;
performing object recognition on the set of sparse codes by using a neurally-inspired vision module to generate object and semantic labels for the set of sparse codes;
performing pattern completion on the object and semantic labels by using a spatiotemporal associative memory module to recall relevant meta-data in the input image;
fusing data related to the input image with the relevant meta-data using bi-directional feedback between the non-linear sparse coding module, the neurally-inspired vision module, and the spatiotemporal associative memory module; and
generating an annotated image with information related to who is in the input image, what is in the input image, when the input image was captured, and where the input image was captured.

2. The system as set forth in claim 1, wherein a user can provide input by selectively activating specific object or semantic label neurons in the neurally-inspired vision module.

3. The system as set forth in claim 1, wherein the one or more processors further perform an operation of using novel activation patterns to direct user attention to areas of the input image considered relevant, which are recalled from stored knowledge in the spatiotemporal associative memory module.

4. The system as set forth in claim 1, wherein the non-linear sparse coding module comprises a hierarchical chain of a plurality of base model layers, wherein within each base model layer there is a sparse-coding process and a saliency-weighted pooling process, and wherein an output of each base model layer is used as an input to the next base model layer in the hierarchy.

5. The system as set forth in claim 1, wherein bidirectional feedback comprises signals for a specialization feedback process, an attentional feedback process, and a pattern refinement and retrieval process, and wherein user input may be provided to any of the processes.

6. The system as set forth in claim 5, wherein the one or more processors further perform operations of:
generating predictions on ambiguous or missing information in the input data;
retrieving previously observed patterns that are similar to patterns in the input data; and
refining the fusion of the input data with the relevant meta-data.

7. A computer-implemented method for visual media reasoning, comprising:
an act of causing one or more processors to execute instructions stored on a non-transitory memory such that upon execution, the one or more processors perform operations of:

filtering an input image having input data using a non-linear sparse coding module and a first series of sparse coding filter kernels tuned to represent objects of general categories, followed by a second series of sparse coding filter kernels tuned to represent objects of specialized categories, resulting in a set of sparse codes;

performing object recognition on the set of sparse codes by using a neurally-inspired vision module to generate object and semantic labels for the set of sparse codes;

performing pattern completion on the object and semantic labels by using a spatiotemporal associative memory module to recall relevant meta-data in the input image;

fusing data related to the input image with the relevant meta-data using bi-directional feedback between the non-linear sparse coding module, the neurally-inspired vision module, and the spatiotemporal associative memory module; and generating an annotated image with information related to who is in the input image, what is in the input image, when the input image was captured, and where the input image was captured.

8. The method as set forth in claim 7, wherein a user can provide input by selectively activating specific object or semantic label neurons in the neurally-inspired vision module.

9. The method as set forth in claim 7, wherein the one or more processors further perform an operation of using novel activation patterns to direct user attention to areas of the input image considered relevant, which are recalled from stored knowledge in the spatiotemporal associative memory module.

10. The method as set forth in claim 7, wherein the non-linear sparse coding module comprises a hierarchical chain of a plurality of base model layers, wherein within each base model layer there is a sparse-coding process and a saliency-weighted pooling process, and wherein an output of each base model layer is used as an input to the next base model layer in the hierarchy.

11. The method as set forth in claim 7, wherein bidirectional feedback comprises signals for a specialization feedback process, an attentional feedback process, and a pattern refinement and retrieval process, and wherein user input may be provided to any of the processes.

12. The method as set forth in claim 11, wherein the one or more processors further performs operations of:
generating predictions on ambiguous or missing information in the input data;
retrieving previously observed patterns that are similar to patterns in the input data; and
refining the fusion of the input data with the relevant meta-data.

13. A computer program product for visual media reasoning, the computer program product comprising computer-readable instructions stored on a non-transitory computer-readable medium that are executable by a computer having a processor for causing the processor to perform operations of:

filtering an input image having input data using a non-linear sparse coding module and a first series of sparse coding filter kernels tuned to represent objects of general categories, followed by a second series of sparse coding filter kernels tuned to represent objects of specialized categories, resulting in a set of sparse codes;

performing object recognition on the set of sparse codes by using a neurally-inspired vision module to generate object and semantic labels for the set of sparse codes;

performing pattern completion on the object and semantic labels by using a spatiotemporal associative memory module to recall relevant meta-data in the input image;

fusing data related to the input image with the relevant meta-data using bi-directional feedback between the non-linear sparse coding module, the neurally-inspired vision module, and the spatiotemporal associative memory module; and generating an annotated image with information related to who is in the input image, what is in the input image, when the input image was captured, and where the input image was captured.

14. The computer program product as set forth in claim 13, wherein a user can provide input by selectively activating specific object or semantic label neurons in the neurally-inspired vision module.

15. The computer program product as set forth in claim 13, further comprising instructions for causing the one or more processors to perform an operation of using novel activation patterns to direct user attention to areas of the input image considered relevant, which are recalled from stored knowledge in the spatiotemporal associative memory module.

16. The computer program product as set forth in claim 13, wherein the non-linear sparse coding module comprises a hierarchical chain of a plurality of base model layers, wherein within each base model layer there is a sparse-coding process and a saliency-weighted pooling process, and wherein an output of each base model layer is used as an input to the next base model layer in the hierarchy.

17. The computer program product as set forth in claim 13, wherein
bidirectional feedback comprises signals for a specialization feedback process, an attentional feedback process, and a pattern refinement and retrieval process, and wherein user input may be provided to any of the processes.

18. The computer program product as set forth in claim 17, further comprising instructions for causing the processor to perform operations of:
generating predictions on ambiguous or missing information in the input data;
retrieving previously observed patterns that are similar to patterns in the input data; and
refining the fusion of the input data with the relevant meta-data.

* * * * *

UNITED STATES PATENT AND TRADEMARK OFFICE
CERTIFICATE OF CORRECTION

PATENT NO.        : 10,176,382 B1
APPLICATION NO.   : 15/265819
DATED             : January 8, 2019
INVENTOR(S)       : Yuri Owechko et al.

Page 1 of 1

It is certified that error appears in the above-identified patent and that said Letters Patent is hereby corrected as shown below:

On the Title Page

Item (72), second inventor's name:
Shanka R. Rao
Should read:
Shankar R. Rao.

Signed and Sealed this
Seventeenth Day of September, 2019

Andrei Iancu
*Director of the United States Patent and Trademark Office*